(12) United States Patent
Ebner et al.

(10) Patent No.: US 12,106,688 B1
(45) Date of Patent: Oct. 1, 2024

(54) ADJUSTABLE LIGHT FIELD FOR EXTENDED REALITY

(71) Applicant: Snap Inc., Santa Monica, CA (US)

(72) Inventors: Christoph Ebner, Graz (AT); Alexander Plopski, Graz (AT); Dieter Schmalstieg, Graz (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/317,847

(22) Filed: May 15, 2023

(51) Int. Cl.
*G09G 3/00* (2006.01)
*G06F 3/01* (2006.01)
*G09G 3/34* (2006.01)

(52) U.S. Cl.
CPC ............. *G09G 3/001* (2013.01); *G06F 3/013* (2013.01); *G09G 3/3406* (2013.01); *G09G 2354/00* (2013.01)

(58) Field of Classification Search
CPC .. G06F 3/0488; G06F 3/04883; G06F 3/0482; G06F 1/163; G09G 5/14; G09G 5/377; G09G 3/001; G09G 3/3406; G09G 2354/00
See application file for complete search history.

(56) References Cited

U.S. PATENT DOCUMENTS 10,871,627 B1 * 12/2020 Fang .................. G02B 27/0093
10,871,825 B1    12/2020 Sztuk et al.
2019/0018236 A1 *  1/2019 Perreault ............ G02B 27/0172
2020/0004028 A1 *  1/2020 Lee ......................... G02B 27/10
2020/0166754 A1 *  5/2020 Leister ................. G02B 5/3083
2022/0321868 A1 * 10/2022 Shishido ............. G02B 27/017

OTHER PUBLICATIONS

Dunn, David, "Required Accuracy of Gaze Tracking for Varifocal Displays", IEEE Conference on Virtual Reality and 3D User Interfaces (VR), (2019), 1838-1842.
Ebner, Christoph, "Video See-Through Mixed Reality with Focus Cues", IEEE Transactions on Visualization and Computer Graphics, vol. 28, No. 5, (May 2022), 2256-2266.
Huang, Fu-Chung, "The Light Field Stereoscope: Immersive Computer Graphics via Factored Near-Eye Light Field Displays with Focus Cues", SIGGRAPH 2015, ACM, (2015), 12 pgs.
"International Application Serial No. PCT/US2024/028595, International Search Report mailed Aug. 7, 2024", 4 pgs.
"International Application Serial No. PCT/US2024/028595, Written Opinion mailed Aug. 7, 2024", 6 pgs.

* cited by examiner

*Primary Examiner* — Dong Hui Liang
(74) *Attorney, Agent, or Firm* — Schwegman Lundberg & Woessner, P.A.

(57) ABSTRACT

A head-wearable extended reality (XR) device comprises a frame and a light field display arrangement mounted to the frame. The light field display arrangement comprises a first display layer and a second display layer. At least one of the first display layer or the second display layer may be selectively displaceable relative to the frame.

20 Claims, 12 Drawing Sheets

ADJUSTABLE LIGHT FIELD FOR EXTENDED REALITY

TECHNICAL FIELD

The subject matter disclosed herein generally relates to extended reality (XR) devices, and, more particularly, to display arrangements for XR devices.

BACKGROUND

An augmented reality (AR) device enables a user to observe a real-world scene while simultaneously seeing virtual content that may be aligned to objects, images, or environments in the field of view of the AR device. A virtual reality (VR) device provides a more immersive experience than an AR device. The VR device blocks out the field of view of the user with virtual content that is displayed based on a position and orientation of the VR device. In general, AR and VR devices are referred to as extended reality (XR) devices, and related systems are referred to as XR systems.

Vergence and accommodation are two separate visual processes. Vergence refers to the movement of the eyes to maintain binocular vision, while accommodation refers to adjustment of an eye's lens to focus on objects at different distances. In natural viewing conditions, vergence and accommodation work together to enable a human to see objects clearly.

Vergence-accommodation conflict (VAC) is a problem experienced by many users of XR devices. Conventional XR devices may use a single image plane that is located at a predetermined distance in front of the user. The fixed focal distance of an XR device may cause a mismatch between vergence and accommodation, leading to issues such as discomfort, visual strain, blurred perception, cybersickness, or visual fatigue. VAC may also be associated with technical inconsistencies in the appearance of virtual content. For example, in an AR device, if the image plane is located at two meters from the user's eyes and the XR device renders a virtual apple on the user's outstretched hand (which is closer than two meters from the user's eyes), the apple may appear blurred when the user focuses on the hand, but sharp when the user focuses on the image plane, in conflict with the appearance of the hand.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
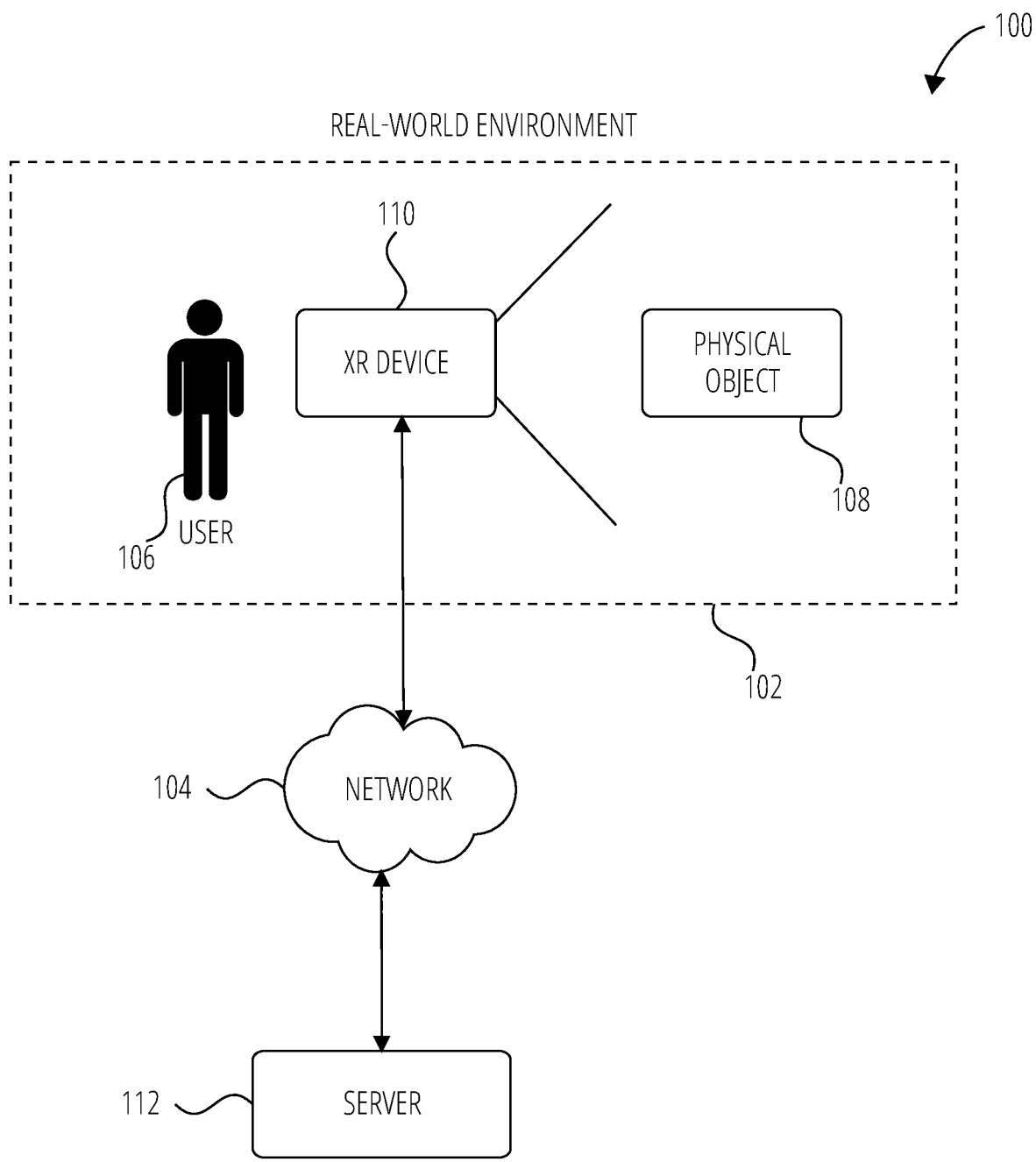
FIG. 1 is a block diagram illustrating a network environment for operating an XR device, according to some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects or environments that reside in the real world are "augmented" or enhanced by computer-generated digital content (also referred to as virtual content or synthetic content). AR can also refer to a system that enables a combination of real and virtual worlds, real-time interaction, and three-dimensional registration of virtual and real objects. A user of an AR system can perceive virtual content that appears to be attached or interact with a real-world physical object. The term "AR application" is used herein to refer to a computer-operated application that enables an AR experience.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment. While examples described in the present disclosure focus primarily on XR devices that provide an AR experience, it will be appreciated that aspects of the present disclosure may also be applied to VR.

A "user session" is used herein to refer to an operation of an application during periods of time. For example, a user session may refer to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In another example, the session starts when the user runs or starts an AR application, or runs or starts a particular feature of the AR application, and stops when the user ends the AR application or stops the particular features of the AR application.

A head-wearable XR device can provide an AR display in different ways. Devices may be categorized as having optical see-through (OST) displays or video pass-through (VPT) displays. In OST technologies, a user views the physical environment directly through transparent or semi-transparent display components, and virtual content can be rendered to appear as part of, or overlaid upon, the physical environment. In VPT technologies, a view of the physical environment is captured by one or more cameras and then presented to the user on an opaque display (e.g., in combination with virtual content). While examples described in the present disclosure focus primarily on OST displays, it will be appreciated that aspects of the present disclosure may also be applied to other types of displays, such as VPT displays.

Referring to OST AR displays, devices incorporating this type of display arrangement may face a number of technical challenges in presenting realistic virtual content, while permitting a relatively unobstructed view of the physical environment. Some of these challenges involve addressing or alleviating VAC.

Varifocal mechanisms attempt to address VAC by providing an image plane with a dynamic focal depth that can be adjusted to follow the focus of the user. However, this approach is reliant on knowing, or accurately estimating, the focal state of the user. For example, a varifocal mechanism may require highly precise focus depth estimation, which, when not obtained, leads to poor or inconsistently rendered results. In simple terms, if the estimation is incorrect, the image plane may be shifted to an incorrect position.

Multilayer light field displays may be used to show virtual content at different depths. These displays emit directional light to create a light field, and may provide a more natural viewing experience than other near-eye arrangements. However, traditional multilayer light field arrangements may be incapable of producing content with acceptable quality within the working volume defined by the layers of the display arrangement, e.g., the device may produce unsatisfactory contrast, diffraction issues, or shadowing effects.

One or more of the systems, devices, or methodologies described herein facilitate solving technical challenges associated with VAC by introducing an XR device with adjustable display layers and/or adjustable image planes. The display layers or the image planes may be adjusted using mechanical or non-mechanical means.

In some examples, an OST XR device is provided that is capable of selectively and dynamically adjusting a light field created using two or more display layers, allowing a user to refocus effectively between the layers. Layers may be individually and selectively shifted, e.g., relative to a frame of the XR device, or relative to each other.

Examples described herein provide an accommodation-supporting XR device that includes a multilayer light field display arrangement in which the layers can be shifted, e.g., using a mechanical adjustment mechanism. In some examples, a head-wearable XR device comprises a frame and a light field display arrangement mounted to the frame. The light field display arrangement may include a first display layer and a second display layer, with at least one of the first display layer or the second display layer being selectively displaceable relative to the frame, or selectively adjustable, to adjust the light field. Each layer may be independently displaceable relative to the frame. This may allow for dynamic adjustment of a working volume in which a light field is defined or presented.

The light field display arrangement may include a light source, such as a backlight, that is arranged to illuminate the first display layer and the second display layer. In some examples, the light source is part of one of the display layers.

The first display layer and the second display layer may be arranged to modulate the backlight in a multiplicative manner. In some examples, the first display layer and the second display layer are attenuating spatial light modulators (SLMs), such as liquid-crystal displays (LCDs).

Examples also provide techniques to incorporate eye tracking uncertainty into the layer adjusting system, e.g., by adapting a working volume dynamically based on eye tracking uncertainty, thereby providing improved contrast across a range of scenarios. An eye tracking sensor may track the eyes of a user of the XR device, and one or more processors communicatively coupled to the eye tracking sensor and to the light field display arrangement may determine, based on the tracking of the one or more eyes of the user, a value of an eye tracking uncertainty indicator. Displacement of a first display layer or a second display layer, or of both layers, may be caused to adjust the light field zone based at least partially on the value of the eye tracking uncertainty indicator.

Examples further provide techniques for imperceptibly, or substantially imperceptibly, adjusting layers of such a display arrangement to improve user comfort, quality, and visual experience. In some examples, one or more processors control the display arrangement, through a low persistence function, such that the light source is deactivated during displacement of the first display layer and/or the second display layer.

According to some examples, the presently described devices, systems, or methodologies provide an improvement to an operation of the functioning of a computer by providing an XR device that can better address VAC, provide an improved OST display, provide better tolerance to erroneous or uncertain eye tracking, achieve a larger working volume when required, or reduce issues such as flickering artifacts, e.g., by synchronizing scaling and image layer movements. One or more of the methodologies described herein may obviate a need for certain efforts or computing resources. Examples of such computing resources include processor cycles, network traffic, memory usage, data storage capacity, power consumption, network bandwidth, and cooling capacity.

Other technical features may be readily apparent to one skilled in the art from the following figures, descriptions, examples, and claims.

FIG. 1 is a network diagram illustrating a network environment 100 suitable for operating an XR device 110, according to some examples. The network environment 100 includes an XR device 110 and a server 112, communicatively coupled to each other via a network 104. The XR device 110 and the server 112 may each be implemented in a computer system, in whole or in part, as described below with respect to FIG. 13. The server 112 may be part of a network-based system. For example, the network-based system may be or include a cloud-based server system that provides additional information, such as virtual content (e.g., three-dimensional models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session.

As mentioned above, the XR device 110 may have different display arrangements. In some examples, the display arrangement may include a screen that displays what is captured with a camera of the XR device 110. In other examples, the display of the device may be transparent or semi-transparent. In other examples, the display may be non-transparent and wearable by the user to cover the field of vision of the user.

The user 106 operates an application of the XR device 110, referred to herein as an AR application. The AR application may be configured to provide the user 106 with an experience triggered or enhanced by a physical object 108, such as a two-dimensional physical object (e.g., a picture), a three-dimensional physical object (e.g., a statue), a location (e.g., at factory), or any references (e.g., perceived corners of walls or furniture, QR codes) in the real-world physical environment. For example, the user 106 may point a camera of the XR device 110 to capture an image of the physical object 108 and a virtual overlay may be presented over the physical object 108 via the display. Experiences may also be triggered or enhanced by a hand or other body part of the user 106, e.g., the XR device 110 may detect and respond to hand gestures.

The XR device 110 includes tracking components (not shown in FIG. 1). The tracking components track the pose (e.g., position, orientation, and location) of the XR device 110 relative to the real-world environment 102 using image sensors (e.g., depth-enabled 3D camera, and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102.

In some examples, the server 112 may be used to detect and identify the physical object 108 based on sensor data (e.g., image and depth data) from the XR device 110, and determine a pose of the XR device 110 and the physical object 108 based on the sensor data. The server 112 can also generate a virtual object based on the pose of the XR device 110 and the physical object 108.

In some examples, the server 112 communicates a virtual object to the XR device 110. The XR device 110 or the server 112, or both, can also perform image processing, object detection and object tracking functions based on images captured by the XR device 110 and one or more parameters internal or external to the XR device 110. The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
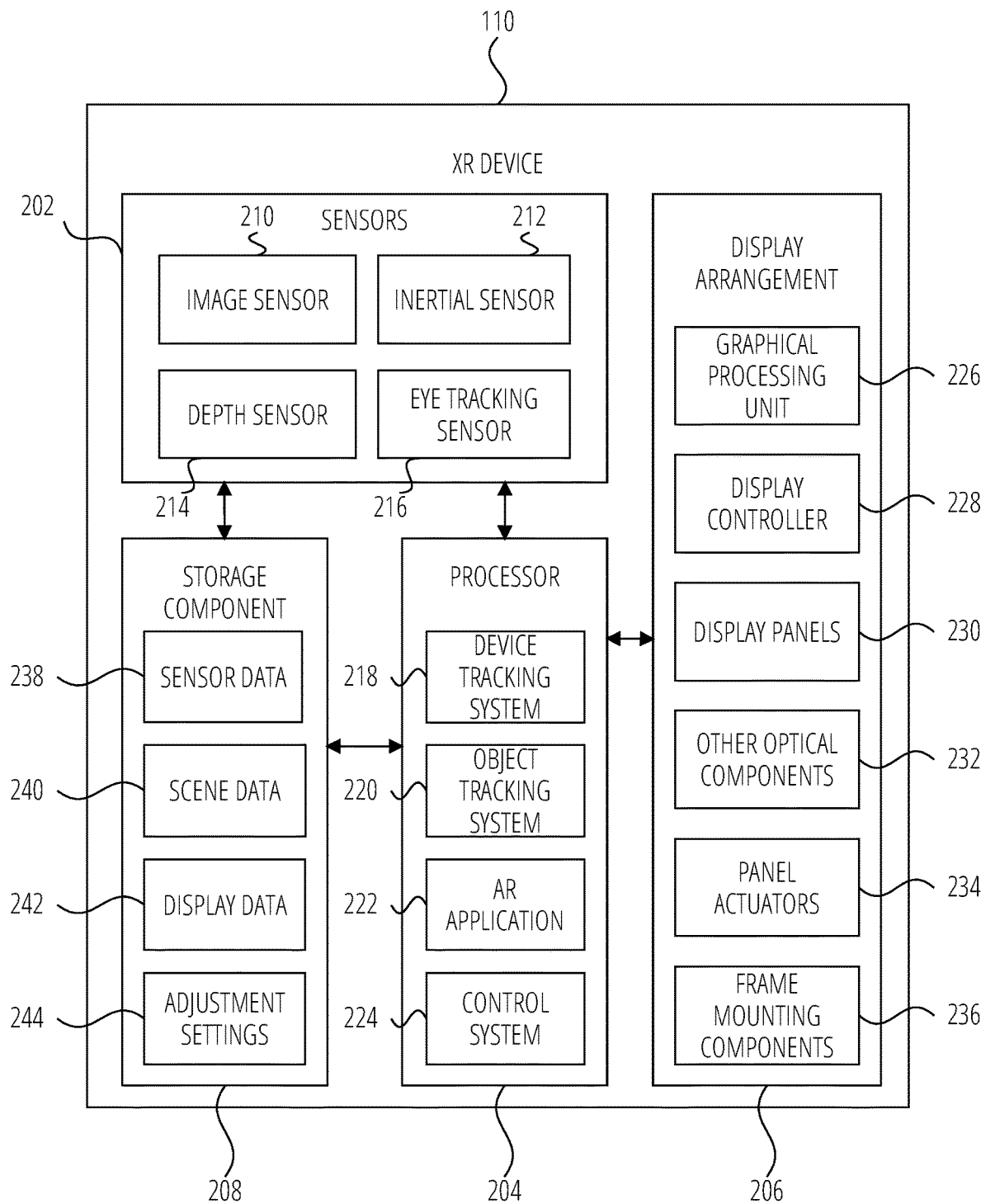
FIG. 2 is a block diagram illustrating components of an XR device, according to some examples.

FIG. 2 is a block diagram illustrating modules (e.g., components, parts, or systems) of the XR device 110, according to some examples. The XR device 110 includes sensors 202, a processor 204, a display arrangement 206, and a storage component 208. It will be appreciated that FIG. 2 is not intended to provide an exhaustive indication of modules of the XR device 110.

The sensors 202 include one or more image sensor 210, one or more inertial sensor 212, one or more depth sensor 214, and one or more eye tracking sensor 216. The image sensor 210 may include, for example, a combination of a color camera, a thermal camera, a depth sensor, and one or multiple grayscale, global shutter tracking cameras.

The inertial sensor 212 includes a combination of a gyroscope, accelerometer, and a magnetometer. In some examples, the inertial sensor 212 includes one or more Inertial Measurement Unit (IMU). An IMU enables tracking of movement of a body by integrating the acceleration and the angular velocity measured by the IMU. The term "IMU" can refer to a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement.

The depth sensor 214 may include a combination of a structured-light sensor, a time-of-flight sensor, passive stereo sensor, and an ultrasound device, time-of-flight sensor. The eye tracking sensor 216 is configured to monitor the gaze direction of the user, providing data for various applications, such as adjusting the focus of displayed content or adjusting display panels, as described herein. The XR device 110 may include one or multiple of these sensors, e.g., image-based or video-based tracking sensors, such as infrared eye tracking sensors or corneal reflection tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and the sensors 202 are thus not limited to the ones described above.

The processor 204 implements a device tracking system 218, an object tracking system 220, an AR application 222, and a control system 224. The device tracking system 218 estimates a pose of the XR device 110. For example, the device tracking system 218 uses data from the image sensor 210 and the inertial sensor 212 to track a location and pose of the XR device 110 relative to a frame of reference (e.g., real-world environment 102). In some examples, the device tracking system 218 uses the sensor data 238 to determine the three-dimensional pose of the XR device 110. The three-dimensional pose is a determined orientation and position of the XR device 110 in relation to the user's real-world environment 102. The device tracking system 218 continually gathers and uses updated sensor data describing movements of the XR device 110 to determine updated three-dimensional poses of the XR device 110 that indicate changes in the relative position and orientation of the XR device 110 from the physical objects in the real-world environment 102. The device tracking system 218 provides the three-dimensional pose of the XR device 110 to a graphical processing unit 226 of the display arrangement 206.

A "SLAM" (Simultaneous Localization and Mapping) system may be used to understand and map a physical environment in real-time. This allows, for example, an XR device to accurately place digital objects in the real world and track their position as a user moves and/or as objects move. The XR device 110 may include a "VIO" (Visual-Inertial Odometry) system that combines data from an IMU and a camera to estimate the position and orientation of an object in real-time. In some examples, a VIO system may form part of a SLAM system, e.g., to perform the "Localization" function of the SLAM system.

The object tracking system 220 enables the tracking of an object, e.g., the physical object 108 or a hand of a user. The object tracking system 220 may include a computer-operated application or system that enables a device or system to track visual features identified in images captured by one or more image sensors, such as one or more cameras. In some examples, the object tracking system builds a model of a real-world environment based on the tracked visual features. An object tracking system may implement one or more object tracking machine learning models to track an object in the field of view of a user during a user session. The object tracking machine learning model may comprise a neural network trained on suitable training data to identify and track objects in a sequence of frames captured by the XR device 110. The machine learning model may, in some examples, be known as a core tracker. A core tracker is used in computer vision systems to track the movement of an object in a sequence of images or videos. It typically uses an object's appearance, motion, landmarks, and/or other features to estimate location in subsequent frames.

The AR application 222 may retrieve a virtual object (e.g., 3D object model) based on an identified physical object 108 or physical environment (or other real-world feature), or retrieve an augmentation to apply to the physical object 108. The graphical processing unit 226 causes display of the virtual object, augmentation, or the like. The AR application 222 includes a local rendering engine that generates a visualization of a virtual object overlaid (e.g., superimposed upon, or otherwise displayed in tandem with) on an image of the physical object 108 (or other real-world feature) captured by the image sensor 210. A visualization of the virtual object may be manipulated by adjusting a position of the physical object or feature (e.g., its physical location, orientation, or both) relative to the image sensor 210. Similarly, the visualization of the virtual object may be manipulated by adjusting a pose of the XR device 110 relative to the physical object or feature.

The control system 224 is configured to control the graphical processing unit 226 and certain other components of the display arrangement 206. For example, the control system 224 may cause adjustment of display layers (e.g., front and rear display panels of the XR device 110), as will be described further below. The display arrangement 206 may also be configured to control adjustment of image planes. The control system 224 accesses data from the various sensors, e.g., images from the image sensor 210 and eye tracking data from the eye tracking sensor 216, to determine required adjustments to the display arrangement 206. For example, the control system 224 may generate an estimated gaze depth and make adjustments to the display arrangement 206 (e.g., adjust display layers in real-time) based on the estimated gaze depth. The control system 224 may also control and synchronize adjustment of the display elements with illumination (lighting) functions, as will be described further below. The control system 224 may work with the AR application 222, e.g., where the AR application 222 is used to render a virtual object, to ensure that object is rendered in a realistic, sharp and/or natural manner. In some examples, the control system 224 may receive feedback regarding the positions of components of the display arrangement 206 to enable real-time adjustments to be made.

The display panels 230 each include a screen or panel configured to display images generated by the processor 204 or the graphical processing unit 226. In some examples, the display panels 230 may be transparent or semi-transparent so that the user 106 can see through the display panels 230.

In some examples, and as described with reference to FIG. 3 and FIG. 4, the XR device 110 may include a first display layer comprising a first SLM layer and a second display layer comprising a second SLM layer, with a light source, such as a backlight, arranged to illuminate the first display layer and the second display layer to cause a directional field of light to be formed in a light field zone defined by the first display layer and the second display layer. The first SLM layer and second SLM layer may be arranged in a stacked manner (e.g., they may be aligned when viewed from the front) and may be displaceable relative to each other along a light path direction.

In some examples, and as will be described below, the display panels 230 may be offset from the gaze path of the user and other optical components 232 may direct light from the display panels 230 into the gaze path. The other optical components 232 may include, for example, one or more mirrors, one or more lenses, and one or more beam splitters.

Panel actuators 234 of the display arrangement 206 may be controlled, e.g., by the control system 224, to adjust positions of the display panels 230. For example, the XR device 110 may include a rear display panel and a front display panel, and the panel actuators 234 may adjust a spacing between these panels during a user session. Actuators may include linear actuators, piezoelectric actuators, or other suitable actuators. The display arrangement 206 may also include suitable frame mounting components 236 for mounting the various parts of the display arrangement 206 to a frame, or housing, of the XR device 110.

Referring again to the graphical processing unit 226, the graphical processing unit 226 may include a render engine that is configured to render a frame of a 3D model of a virtual object based on the virtual content provided by the AR application 222 and the pose of the XR device 110 (and, in some cases, the position of a tracked object). In other words, the graphical processing unit 226 uses the three-dimensional pose of the XR device 110 to generate frames of virtual content to be presented on the display panels 230. For example, the graphical processing unit 226 uses the three-dimensional pose to render a frame of the virtual content such that the virtual content is presented at an orientation and position in the display panels 230 to properly augment the user's reality. As an example, the graphical processing unit 226 may use the three-dimensional pose data to render a frame of virtual content such that, when presented on the display panels 230, the virtual content is caused to be presented to a user so as to overlap with a physical object in the user's real-world environment 102. The graphical processing unit 226 can generate updated frames of virtual content based on updated three-dimensional poses of the XR device 110 and updated tracking data generated by the abovementioned tracking components, which reflect changes in the position and orientation of the user in relation to physical objects in the user's real-world environment 102, thereby resulting in a more immersive experience.

The graphical processing unit 226 transfers the rendered frame to the display controller 228. The display controller 228 is positioned as an intermediary between the graphical processing unit 226 and the display panels 230, receives the image data (e.g., rendered frame) from the graphical processing unit 226, re-projects the frame (by performing a warping process) based on a latest pose of the XR device 110 (and, in some cases, object tracking pose forecasts or predictions), and provides the re-projected frame to the display panels 230.

It will be appreciated that, in examples where an XR device includes multiple displays, each display may have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement may deliver separate images or video streams to each eye. Where an XR device includes multiple displays, steps may be carried out separately and substantially in parallel for each display, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, three-dimensional view. Thus, while a single set of display arrangement components may be discussed to describe some examples, e.g., display layers and other optical components that direct images to one eye, similar techniques may be applied to cover both eyes by providing a further set of display arrangement components.

The storage component 208 may store various data, such as sensor data 238, scene data 240, display data 242, and adjustment settings 244. Sensor data 238 may include data obtained from one or more of the sensors 202, e.g., eye tracking data from the eye tracking sensor 216. Scene data 240 may, for example, include depth maps generated by the XR device 110. The processor 204 may generate, based on the sensor data 238, a depth map in the form of a two-dimensional representation of three-dimensional scene information. For example, each pixel in the map corresponds to a point in the scene and stores its distance from the camera or the observer. The depth map may thus essentially be a grayscale image, with pixel intensity values representing the depth or distance of objects in the scene. Display data 242 may include images or virtual content displayed by the display arrangement 206. Adjustment settings 244 may include settings or rules to be followed by the processor 204 in monitoring and causing adjustment of the display arrangement 206.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

Figure 3:
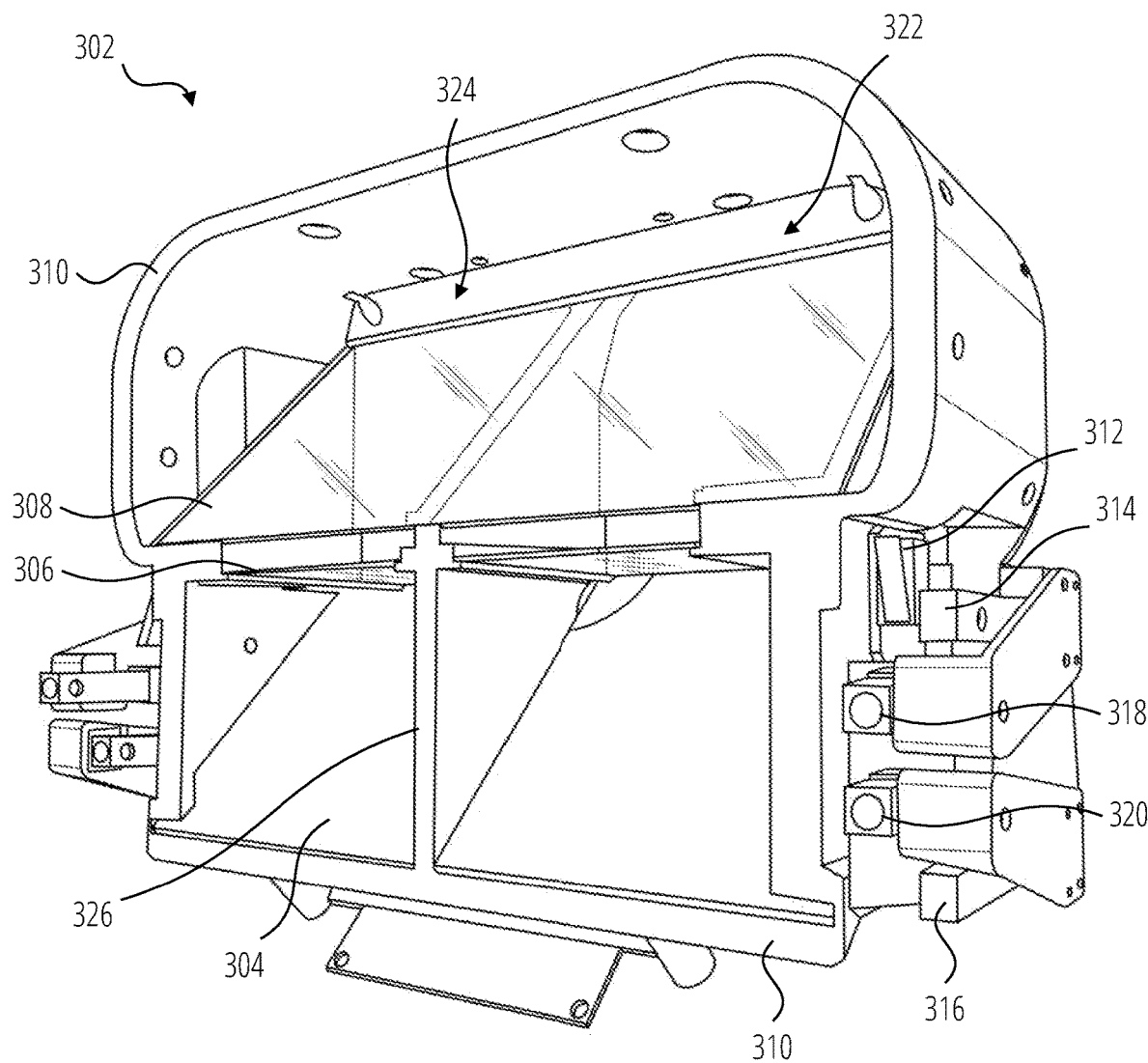
FIG. 3 is a perspective view of parts of an XR device, according to some examples.
Figure 4:
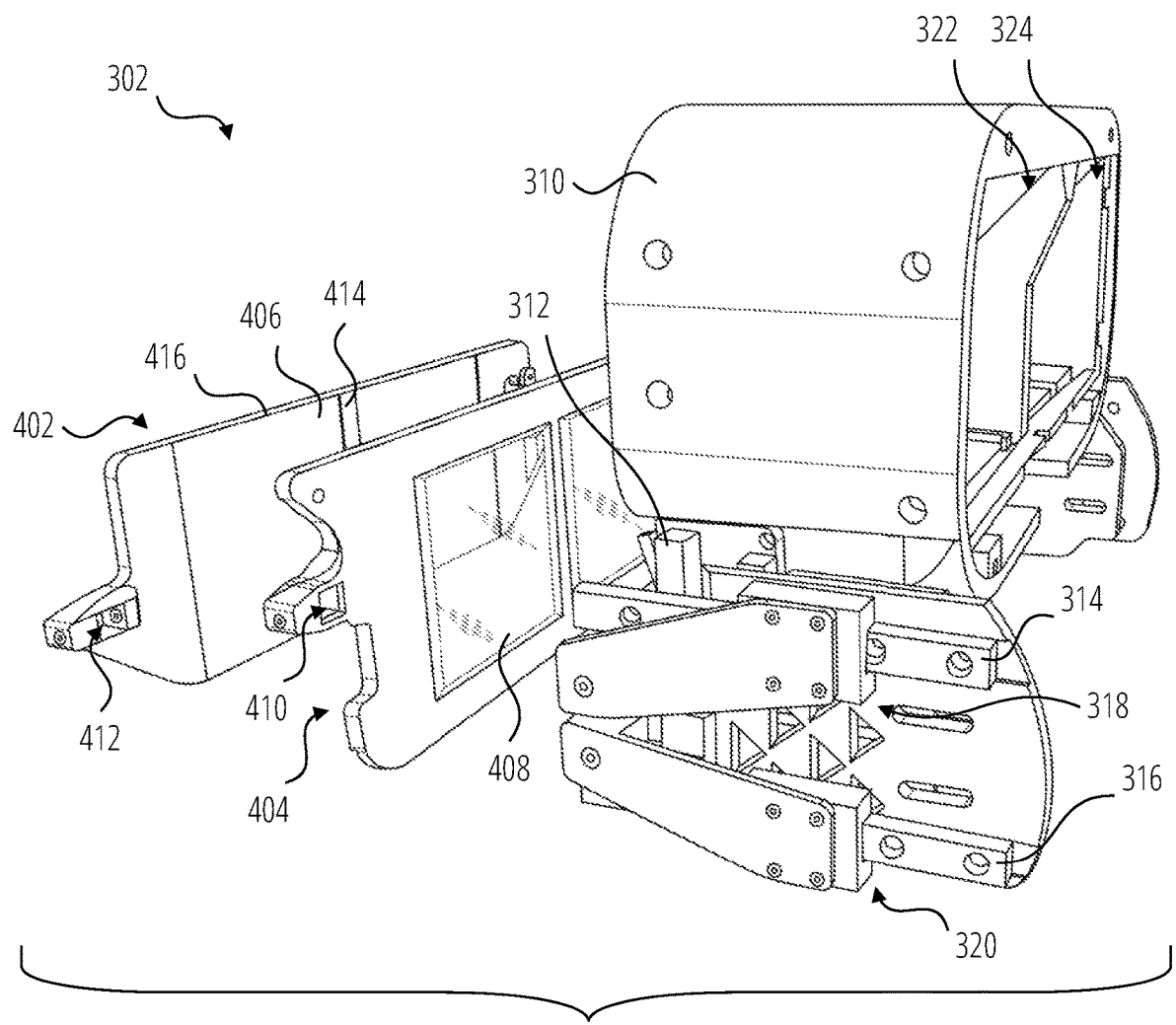
FIG. 4 is a partially exploded perspective view of parts of an XR device, according to some examples.

FIG. 3 and FIG. 4 illustrate parts of an XR device 302, according to some examples. The XR device 302 has an OST light field display arrangement. FIG. 3 and FIG. 4 are intended only to illustrate certain aspects of the XR device 302, particularly its light field display arrangement, and it should be understood that numerous components of the XR device 302 are omitted from FIG. 3 and FIG. 4 in order better to illustrate these aspects.

The XR device 302 includes a frame 310 to which the components of the light field display arrangement are mounted. The frame 310 may be made from any suitable material, such as plastic or metal, or combinations thereof. The frame 310 defines a left eye zone 322 on one side of the frame 310 and a right eye zone 324 on the other side of the frame 310, separated from the left eye zone 322 by a bridge 326. The light field display arrangement provides a similar set of display elements on each respective side of the frame 310 in order to generate and guide light along a light path in the left eye zone 322 and the right eye zone 324, respectively, and thus to the left eye and the right eye of the user. It will be appreciated that the images generated for each eye may be different (typically only slightly different) to provide for realistic binocular viewing.

Referring to FIG. 4, the XR device 302 includes a first display layer in the example form of a rear display layer 402 and a second display layer in the example form of a front display layer 404 (these layers are not shown in FIG. 3). The rear display layer 402 includes, for each set of display elements, a rear LCD panel 406. The front display layer 404 includes, for each set of display elements, a front LCD panel 408. The rear display layer 402 further includes a backlight 416 that is selectively switched on, in use, to illuminate the rear LCD panel 406. The backlight 416 defines a starting point of a light path of the XR device 302, along which light is modulated, directed, and guided to reach the eyes of the user. The LCD panels on each layer may be separated by a divider 414, as marked with respect to the rear display layer 402 in FIG. 4.

The rear display layer 402 and the front display layer 404 are operatively mounted to the frame 310 and adjustable via an adjustment mechanism. The adjustment mechanism includes, on each side of the frame 310, a front panel guide rail 314 and a rear panel guide rail 316. A front panel linear actuator 318 is slidably mounted to the front panel guide rail 314 and a rear panel linear actuator 320 is slidably mounted to the rear panel guide rail 316. The front panel guide rail 314 and the rear panel guide rail 316 are fixedly mounted to the frame 310.

On each side of the frame 310, the front panel linear actuator 318 mates with an actuator slot 410 of the front display layer 404, and the rear panel linear actuator 320 mates with an actuator slot 412 of the rear display layer 402, such that, during operation, when the front panel linear actuator 318 slides along the front panel guide rail 314, the front display layer 404 moves together with the front panel linear actuator 318 (closer to or away from the frame 310, depending on control instructions sent to the front panel linear actuator 318), and when the rear panel linear actuator 320 slides along the rear panel guide rail 316, the rear display layer 402 moves together with the rear panel linear actuator 320 (closer to or away from the frame 310, depending on control instructions sent to the rear panel linear actuator 320). In this way, the display layers can be moved closer to the other optical components along the light path or away from the other optical components along the light path. An end stop 312 is mounted to the frame 310 for each set of display elements, as shown in FIG. 3 and FIG. 4, e.g., to limit movement of the front display layer 404 in the direction of the frame 310 and/or to facilitate tracking of layer positions, as described further below. Each linear actuator may be powered by, for example, an electric motor such as a stepper motor.

The rear display layer 402 and the front display layer 404 are independently and selectively displaceable relative to the frame 310 using the mechanisms described above. In other words, the rear display layer 402 may be moved while the front display layer 404 remains stationary relative to the frame 310, or vice versa, or the rear display layer 402 and the front display layer 404 may be moved at the same time relative to the frame 310. The rear display layer 402 and the front display layer 404 may also be moved at different speeds or timing intervals.

As alluded to above, in some cases, a control system may continuously monitor the positions of the rear display layer 402 and the front display layer 404. This may be achieved with or without a feedback mechanism. For example, the end stops 312 may be used to establish a fix point for a display location in examples where the linear actuators do not provide explicit positional feedback. The end stops 312 may thus establish a reference for determining the position of the displays. As an illustrative example, for each user session, the front display layer 404 may be moved in the direction of the frame 310 until the end stops 312 are triggered, and the rear display layer 402 may be moved in a similar fashion (e.g., up to a position abutting the front display layer 404). This position may be defined as a reference position or starting position, e.g., as "position 0," allowing the XR device 302 to keep track of movements of the layers during the user session. For example, at a given point in time, the XR device 302 may store an indication that the front display layer 404 has been moved into "position 0+2 (two steps taken)." This configuration may allow the XR device 302 to keep track of the position of the panels without an explicit feedback mechanism or feedback loop. However, in other examples, the adjustment mechanism of the XR device may provide explicit positional feedback, e.g., obviating the need for end stops.

The arrangement in FIG. 3 and FIG. 4 allows for adjustment of the spacing between the rear display layer 402 and the front display layer 404, the adjustment of the spacing between the rear display layer 402 and the other optical components in the light path (e.g., lenses), the adjustment of the spacing between the front display layer 404 and the other optical components in the light path, or combinations thereof. These other optical components, or display elements, include (on each side of the frame 310), a mirror 304, a lens 306, and a beam splitter 308.

In use, the rear display layer 402 and the front display layer 404 are used to generate virtual content to be presented to the user. Each layer provides a different depth, or focal plane. For each eye zone, the rear LCD panel 406 is responsible for generating an initial image for the specific eye of that eye zone. Each LCD panel consists of an array of liquid crystal cells that can be individually controlled to modulate the amount of light passing through them. The backlight 416 is located behind the rear LCD panel 406 and provides for illumination of the LCD panels. The backlight 416 may be a uniform backlight, with the panels serving as "transparent" LCD panels to modulate the uniform light in a multiplicative manner.

The front LCD panel 408 is located in front of the rear LCD panel 406 (in the light path). The front LCD panel 408 does not include a light source, and is selectively transmissive, allowing it to operate as a modulator to selectively allow or block light coming from the rear LCD panel 406. The modulated light is then directed via the mirror 304, through the lens 306 and into the relevant eye of the user via the beam splitter 308.

It is noted that, in some examples, an LCD panel of the XR device 302 does not "allow" or "block" light in a binary manner. Instead, the LCD panel may be more advanced in that it is capable of blocking light to a variable degree, e.g., each subpixel may control light in 256 steps. In other words, the LCD panel may control the amount of light passing through it with a certain granularity, e.g., with zero being completely black (no light allowed to pass through). This may allow for a wide range of brightness levels, better image quality, improved contrast and/or smoother gradients, enhancing the visual experience.

The mirror 304 is located between the front LCD panel 408 and the lens 306 and is used to reflect the modulated light towards the lens 306. The lens 306 is designed and arranged to direct the modulated light towards the eye, and facilitates presentation of images that are sharp and aligned with the field of view of the user. By controlling the pattern of light that passes through the rear LCD panel 406 and front LCD panel 408, and by presenting slightly different images via each set of display elements, the desired content can be directed to the eyes of the user, creating content that is presented as overlaid on the physical environment.

Thus, the rear LCD panel 406 and the front LCD panel 408 are used to recreate, or approximate, a directional light field within the field of view of the user, and the use of two spaced-apart panels emitting view-dependent light allows the user to adjust focus in the virtual volume, also referred to as a working volume, between the two planes created by the two panels. Given that the rear display layer 402 and the front display layer 404 are at different distances from the lenses of the XR device 302, the two planes will appear at different distances to the user. For example, the image plane of the front display layer 404 may be presented to appear at 20 centimeters from the user, while the image plane of the rear display layer 402 may be presented to appear at 50 centimeters from the user. Virtual content may thus be rendered to be naturally in focus between 20 and 50 centimeters.

The physical environment is visible to the user through the beam splitter 308. It will be evident from FIG. 3 and FIG. 4 that the rear display layer 402 and the front display layer 404, as well as the light source (backlight 416), are offset from a gaze path of the user. In other words, these elements are not directly in the view of the user when the user is wearing the XR device 302. Instead, light is guided into the gaze path along the light path, and then into the gaze path by the beam splitter 308. This allows the user to have a clearer view of the real-world environment.

As mentioned above, several components of the XR device 302 are not shown in FIG. 3 and FIG. 4. It will be appreciated that these components may include a computing device, which can be of any suitable type so as to be carried by the frame 310 and, in some examples, of a suitable size and shape, so as to be disposed in the frame 310. The computing device can include one or more processors with memory, wireless communication circuitry, and a power source. As discussed with reference to FIG. 11 below, the computing device may comprise low-power circuitry, high-speed circuitry, and a display processor. Various other examples may include these elements in different configurations or integrated together in different ways.

The XR device 302 may also include a battery or other suitable portable power supply. The XR device 302 can include a connector or port (not shown) suitable for charging the battery, a wireless receiver, transmitter or transceiver (not shown), or a combination of such devices.

In use, a user of the XR device 302 will be presented with information, content and various 3D user interfaces on the near eye displays. As described in more detail elsewhere herein, the user can then interact with the XR device 302 using a suitable input device, voice inputs or touch inputs on an associated device (e.g., the user device 1138 shown in FIG. 11), and/or hand movements, locations, and positions detected by the XR device 302.

The XR device 302 may include a first or left camera and a second or right camera. Other examples contemplate the use of a single or additional (i.e., more than two) cameras. The XR device 302 may include any number of input sensors or other input/output devices in addition to the cameras. Such sensors or input/output devices can additionally include biometric sensors, location sensors, motion sensors, and so forth. The XR device 302 may include one or more eye tracking sensors to monitor the gaze direction of the user and adjust the displayed content, or components of the XR device 302, accordingly.

In some examples, the rear display layer 402 and/or the front display layer 404 may be shifted based on where the user is focusing (or should be focusing). For example, if the user is focusing on their outstretched hand that is 40 centimeters away from their eyes (in the example scenario where a virtual object is presented in the hand), the front display layer 404 and the rear display layer 402 may be shifted to shift the respective image planes to present at 35 centimeters and 45 centimeters from the eyes of the user. As another example, if the user is focusing on an object that is 5 meters away from their eyes, the front display layer 404 and the rear display layer 402 may be shifted to shift the respective image planes to present at 1 meter and 10 meters from the eyes of the user.

Figure 5:
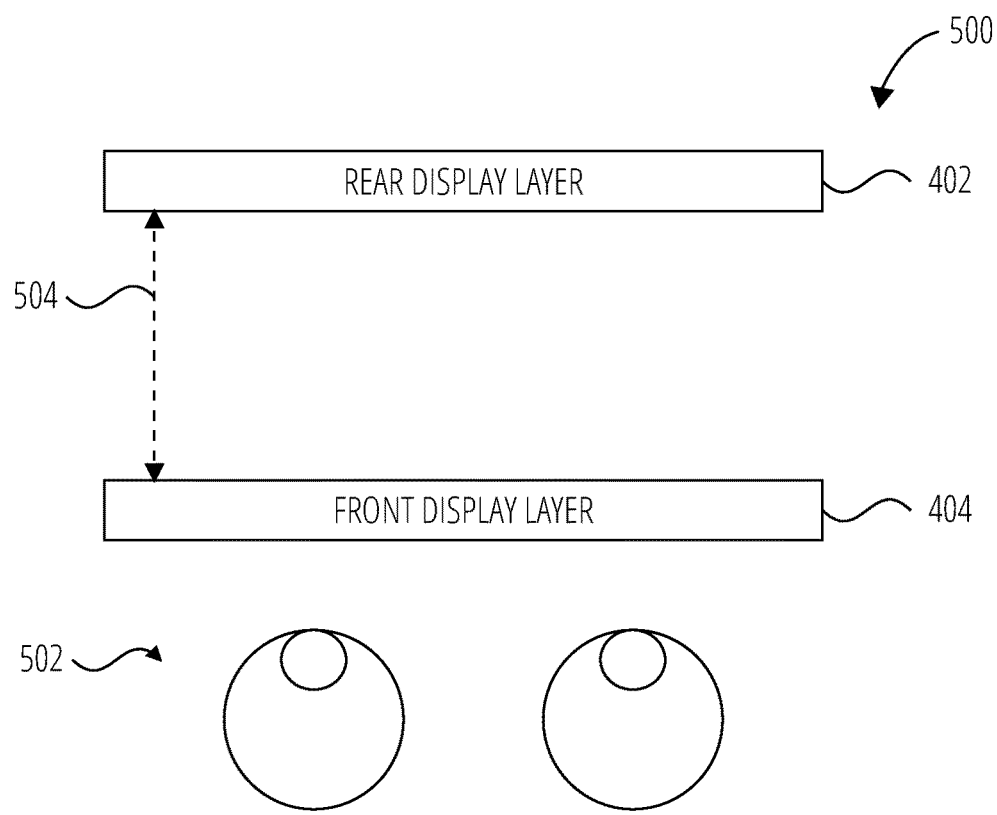
FIG. 5 is a diagrammatic top view illustration of a front display layer and a rear display layer of an XR device, according to some examples, showing the layers in a first position.
Figure 6:
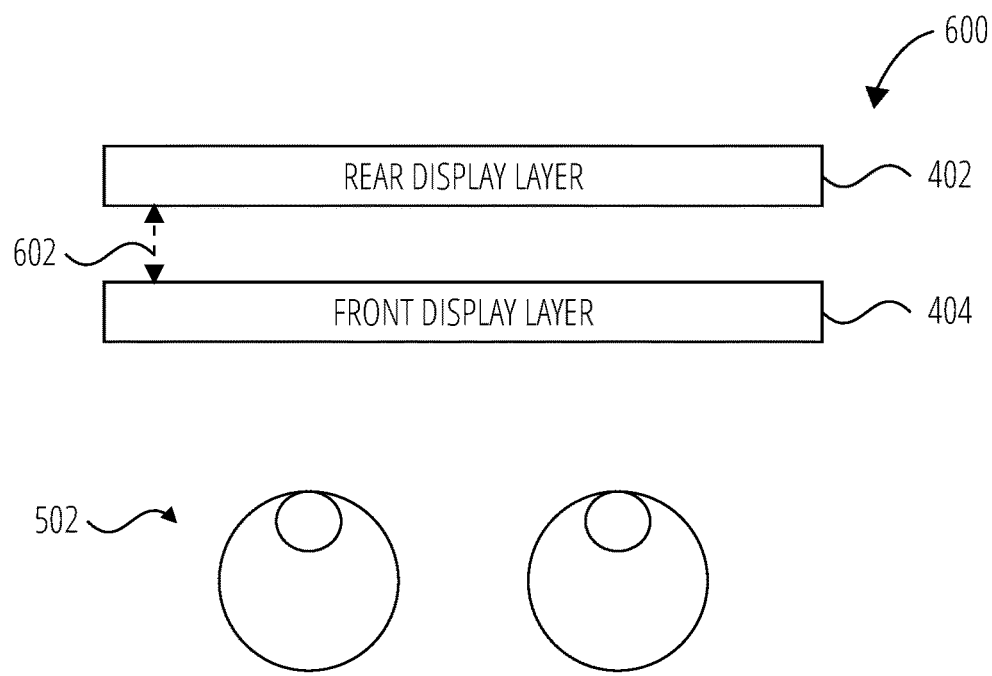
FIG. 6 is a diagrammatic top view illustration of the front display layer and the rear display layer of FIG. 5, showing the layers in a second position, according to some examples.

FIG. 5 and FIG. 6 are diagrammatic illustrations of the rear display layer 402 and the front display layer 404, according to some examples, illustrating selective adjustment of these layers relative to each other and relative to the eyes 502 of the user of the XR device. As mentioned, the rear display layer 402 and the front display layer 404 may allow for the modulation of a uniform backlight. When observed through suitable lenses and/or other optical elements, virtual and magnified images of the SLMs of these layers are created.

Conventionally, one of the virtual and magnified images of a multilayer display may be located at close to optical infinity, and another close to the user (observer). However, the working volume may be limited by diffraction effects and the ability to generate high-contrast imagery between these fixed layers for large volumes. To address or at least alleviate this, examples of the present disclosure allow for shifting of the rear display layer 402 and the front display layer 404 to adjust the light field zone defined by these layers.

In a first position, as shown in the diagram 500 of FIG. 5, the rear display layer 402 and the front display layer 404 are shifted so as to be relatively far apart (e.g., using the mechanism described with reference to FIG. 3 or FIG. 4, or any other suitable mechanism). This increased spacing 504 may, for example, be suitable in situations where focus distance uncertainty is high. It is noted that the distance of the increased spacing 504, as shown in FIG. 5, may depend on various factors, such as the focus distance, the resolution of the displays used, and the lenses and other optical elements included in the arrangement.

In a second position, as shown in the diagram 600 of FIG. 6, the rear display layer 402 and the front display layer 404 are shifted so as to be closer to each other, providing a reduced spacing 602 between the displays. This reduced spacing 602 may, for example, be suitable in situations where eye tracking confidence (and thus focus distance certainty) is high.

In other words, where the XR device has a relatively high degree of certainty as to where the user is focusing or attempting to focus, the panels may be shifted closer together as shown in FIG. 6. For example, in the case where the user is focusing on their outstretched hand that is 40 centimeters away from their eyes, the front display layer 404 and the rear display layer 402 may be adjusted to shift the respective image planes to present at 35 centimeters and 45 centimeters from the eyes of the user if the certainty is high (e.g., as in FIG. 6), while the front display layer 404 and the rear display layer 402 may be adjusted to shift the respective image planes to present at 20 centimeters and 60 centimeters from the eyes of the user if the certainty is low (e.g., as in FIG. 5).

In some examples, e.g., where eye tracking confidence is above a certain threshold, the rear display layer 402 and the front display layer 404 may be moved very closely together and may even abut each other. In some examples, one of the layers, e.g., the front display layer 404, may be adjusted to a "white mode" in which it is essentially disabled and does not perform any light modulation, thus transforming the display arrangement into an adjustable single-layer or single-panel arrangement. However, the XR device may dynamically switch between modes, e.g., a few seconds later, the XR device may detect reduced eye tracking confidence, activate the front display layer 404, adjust the spacing between the layers, and utilize both layers to generate a light field.

Figure 7:
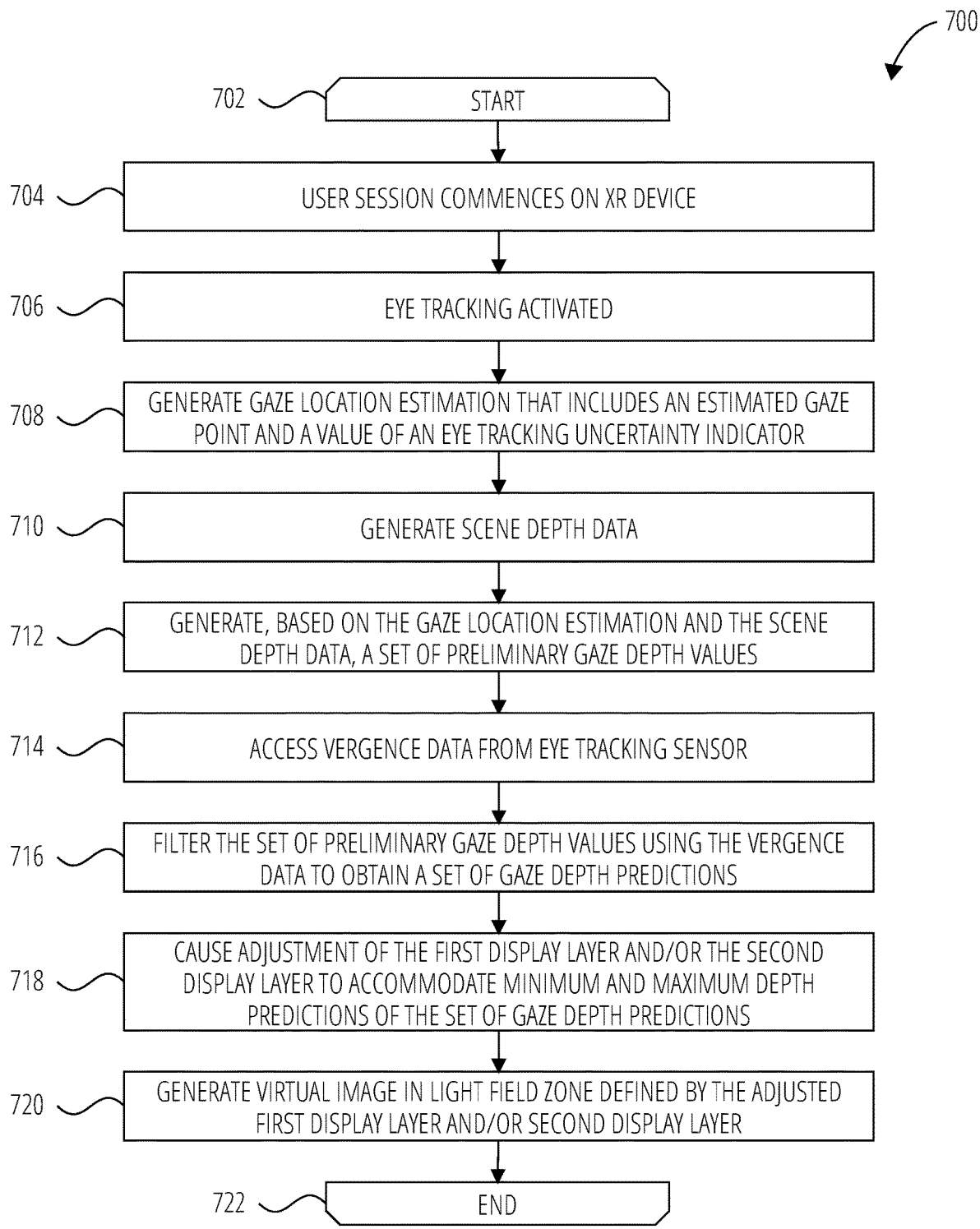
FIG. 7 is a flowchart illustrating a method suitable for adjusting a light field zone of an XR device based on eye tracking data, according to some examples.

As mentioned above, in some examples, adjustment of the display layers of an XR device may be gaze-contingent. Specifically, in some cases, adjustment may be based on a certainty with which the XR device is able to track the eyes of the user or detect a focus depth of the user. FIG. 7 is a flowchart illustrating a method 700 suitable for adjusting a light field zone of an XR device based on eye tracking data, according to some examples.

Operations in the method 700 may be performed by an XR device using components (e.g., parts, modules, or engines) described above with respect to FIGS. 1-6. The method 700 is described by way of example below with reference to the XR device 110, including the eye tracking sensor 216, the control system 224 and the panel actuators 234 of the XR device 110. However, it shall be appreciated that at least some of the operations of the method 700 may be deployed on various other hardware configurations or be performed by similar components residing elsewhere. The term "operation" is used to refer to elements in the drawings for ease of reference and it will be appreciated that each "operation" may identify one or more operations, processes, actions, or steps.

The method 700 commences at opening loop element 702 and proceeds to operation 704, where a user session is activated on the XR device 110. At operation 706, eye tracking is activated and the eye tracking sensor 216 continuously monitors the gaze of the user and transmits eye tracking data to the storage component 208 or the processor 204 for downstream processing. For example, the XR device 110 may employ binocular gaze tracking to determine the depth of the fixation point to obtain a current focal depth, also referred to as gaze depth.

As described elsewhere, the XR device 110 includes multiple display panels 230, e.g., providing a first display layer and a second display layer, each causing presentation of virtual content at an image plane that is located a certain distance from the user. These image planes may be selectively and independently adjusted, e.g., by displacing the display panels 230 using the panel actuators 234. While the user session is active, the XR device 110 may thus continuously or periodically monitor and adjust a first display layer and/or a second display layer In some examples, and as is the case in the method 700 of FIG. 7, the XR device 110 generates a gaze location estimation that includes an estimated gaze point and a value of an eye tracking uncertainty indicator at operation 708. For example, the eye tracking sensor 216 may output the estimated gaze point of the user together with an uncertainty value that is expressed in degrees.

At operation 710, the XR device 110 generates scene depth data. The scene depth data may include a depth map of a scene that the user is viewing through the XR device 110. A non-limiting example of such a depth map 802 is diagrammatically illustrated in FIG. 8. It will be appreciated that the depth map 802 is shown in simplified form, merely for illustrative purposes, and does not, for example, show the pixel intensity values that would be present in a typical depth map.

Figure 8:
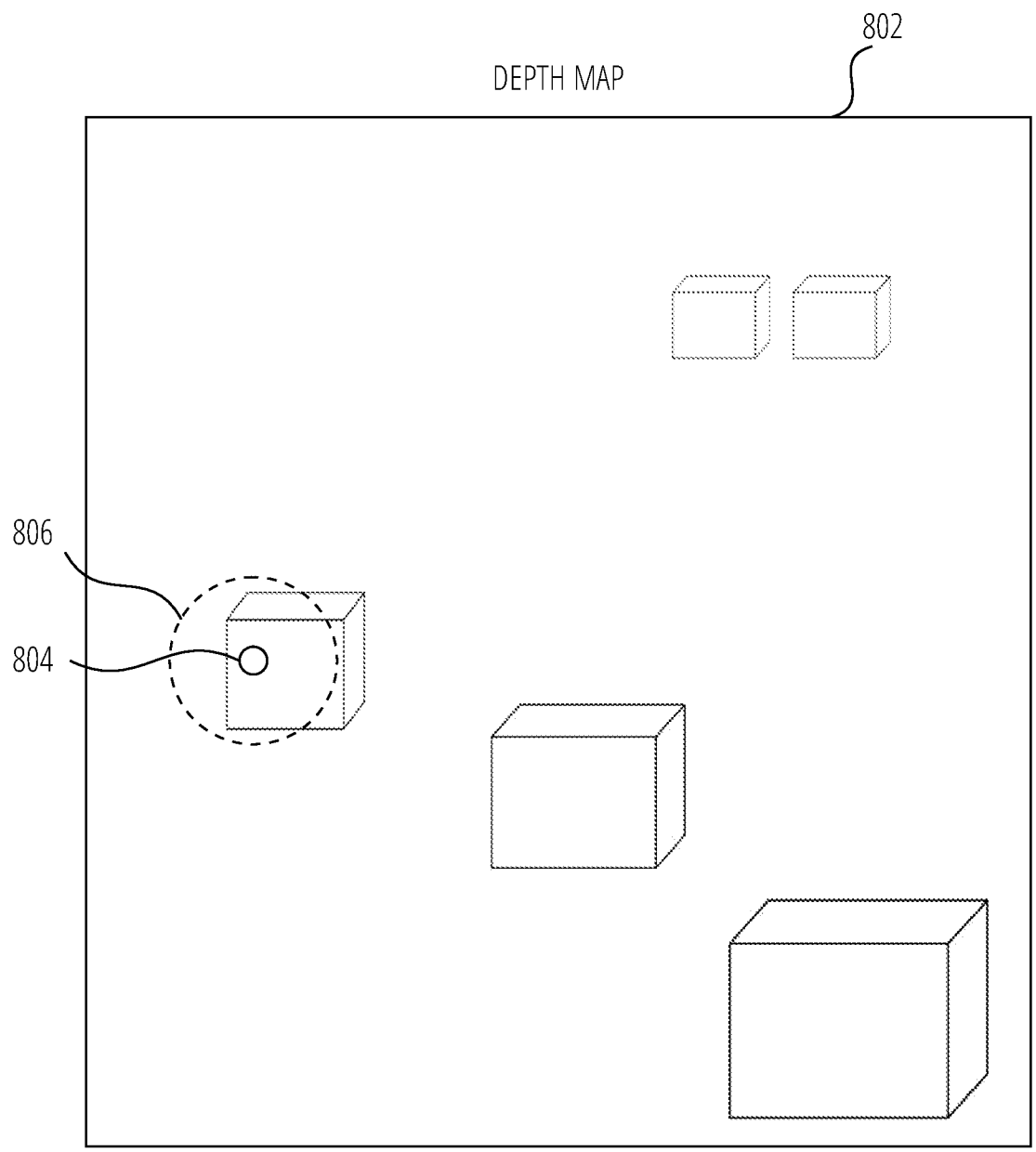
FIG. 8 is a diagrammatic illustration of an estimated gaze point within a depth map of a scene viewed by a user of an XR device, according to some examples.

The depth map 802 illustrates the estimated gaze point 804 generated by the eye tracking sensor 216, as well as a region of uncertainty 806 that is defined around the estimated gaze point 804 based on the uncertainty indicator. For example, if the eye tracking sensor 216 returns a high uncertainty value, the region of uncertainty 806 may be relatively large to account for the uncertainty, while it may be smaller if the eye tracking sensor 216 returns a lower uncertainty value. In FIG. 8, the region of uncertainty 806 is circular and has a radius or diameter that is defined based on the uncertainty indicator.

Based on the gaze location estimation and the scene depth data, the control system 224 then generates a set of preliminary gaze depth values at operation 712. For example, the estimated gaze point 804 and the region of uncertainty 806 may be intersected with the depth map 802, and the different depth values falling within the region of uncertainty 806 are selected as possible candidates for the focus depth of the user. These "focus distance candidates" are therefore the set of preliminary gaze depth values.

At operation 714, the control system 224 accesses vergence data from the eye tracking sensor 216. The vergence data is used to filter the set of preliminary gaze depth values to obtain a reduced number of "candidates," referred to herein as a set of gaze depth predictions (operation 716). For example, the vergence data in the eye tracking data may include a vergence angle, and this vergence angle may effectively be used to eliminate irrelevant "candidates."

The control system 224 causes adjustment of a first display layer of a light field display arrangement of the XR device 110 and/or a second display layer of the light field display arrangement, based on the set of gaze depth predictions. Specifically, at operation 718 of the method 700 illustrated in FIG. 7, the control system 224 analyzes the set of gaze depth predictions and obtains a minimum depth prediction and a maximum depth prediction. The control system 224 then controls the first display layer and the second display layer, e.g., adjusts them using the panel actuators 234, to cover the minimum depth prediction and a maximum depth prediction. In some examples, one of the display layers is displaced such that the location at which it generates virtual content corresponds to the minimum depth prediction, while the other display layer is displaced such that the location at which it generates virtual content corresponds to the maximum depth prediction.

At operation 720, a virtual image is presented to the user in a light field zone defined by the adjusted first display layer and second display layer, in the manner described above. For example, a light field may be presented to each eye of the user, covering the working volume spanned by the two adjusted layers. The light field zone is thus adjusted to accommodate the minimum depth prediction and the maximum depth prediction of the control system 224. The method 700 concludes at closing loop element 722.

In some examples, where no or insufficient eye tracking information is available, e.g., due to lack of eye tracking cameras or eye tracking failure, display layers may be dynamically adjusted without using eye tracking information, e.g., eye tracking uncertainty or certainty information. In some cases, the display layers may be adjusted according to the depth of the rendered (or to be rendered) virtual content. For example, if eye tracking information is unavailable or if the XR device detects that an eye tracking function is failing, the XR device may consider the depth of the rendered content. For example, if one virtual object is rendered at 1 m and another virtual object is rendered at 30 cm, a rear display layer can be moved so as to render at 1 m while the front display layer is moved to render at 30 cm. As another example, if the view only contains one virtual object at 50 cm, both planes may be moved substantially to that distance. Adjustments of this nature may allow for utilization of the necessary volume, to the extent possible, while attempting to maximize contrast.

As described elsewhere, the XR device, according to some examples, is configured to shift its display layers, e.g., relative to each other, or in unison relative to some other component, such as the frame of the XR device. However, shifting of layers or image planes may introduce visual artifacts, e.g., the adjustment in distance from an LCD screen to a lens within the light path may change the magnification of the lens. It is possible to rescale the displayed image in an attempt to make such a transition largely imperceptible, but there may be latency between the layer shifting and a refreshing operation, and this may have unwanted effects, such as flickering. Therefore, in some examples, it is desirable to synchronize scaling and shifting (e.g., moving of layers).

Examples provide techniques for imperceptibly, or substantially imperceptibly, adjusting layers and/or image planes by synchronizing a lighting segment and a motion segment of an adjustment interval of a display arrangement. The diagram 900 of FIG. 9 illustrates adjustment intervals 912 of a light field display arrangement of an XR device, according to some examples.

Figure 9:
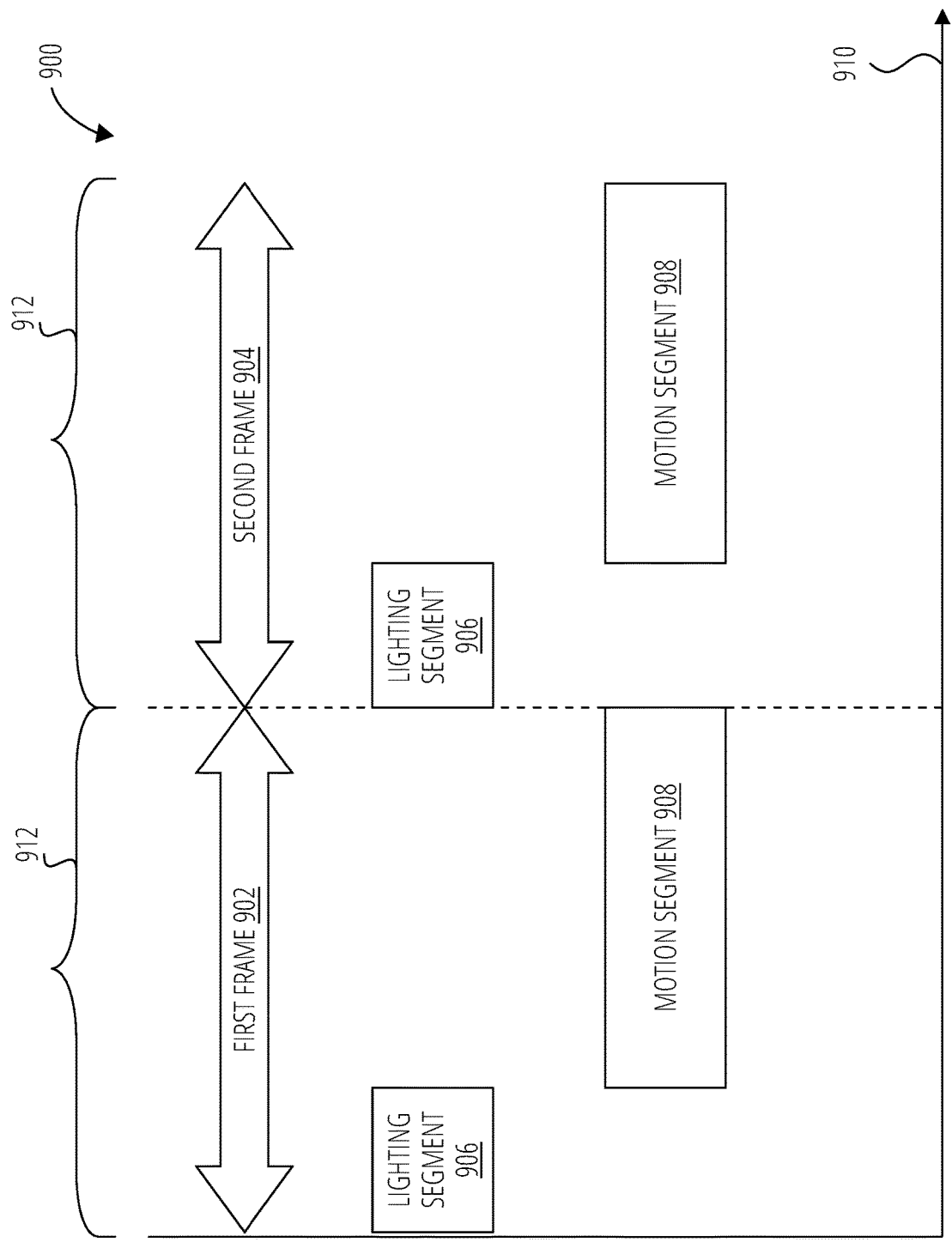
FIG. 9 diagrammatically illustrates adjustment intervals of a light field display arrangement of an XR device, according to some examples.

In FIG. 9, the XR device comprises a pair of light field display layers, e.g., in the form of a first LCD screen and a second LCD screen (not shown). The two display layers have the same frame rate. In other words, a frame period, during which a particular image is displayed or generated by a layer, is the same for both the first layer and the second layer. Thus, the duration of first frame 902 and the second frame 904, as shown in FIG. 9, applies to both layers.

The XR device of FIG. 9 has a low persistence display mechanism. This means that the lighting source, e.g., the backlight that illuminates the two display layers, is not switched on for the entirety of the frame period. The low persistence configuration is illustrated by the lighting segment 906 in FIG. 9. FIG. 9 includes a time axis 910 to illustrate that the lighting segment 906 (the period of time for which the lighting source is switched on) only covers a portion of the frame period of each frame.

FIG. 9 further illustrates the manner in which shifting of layers, e.g., a varifocal transition during which the display layers are moved relative to each other, is synchronized with the lighting segment 906. In some examples, adjustment of layers only occurs during a motion segment 908 of the adjustment interval 912, which does not overlap with the lighting segment 906. In other words, layers are only adjusted while the lighting source is switched off.

Accordingly, in some examples, a frame period of the display layers defines the adjustment interval, and the adjustment interval includes a lighting segment and a motion segment. The lighting segment and the motion segment are synchronized such that they occur sequentially, meaning that a processor of the XR device (e.g., the control system 224) activates the lighting source (e.g., backlight 416) and keeps the layers stationary relative to the frame of the XR device during the lighting segment, while the processor deactivates the lighting source and causes displacement of the layers relative to the frame during the motion segment. It is noted that, in such cases, the image (e.g., virtual content presented to the user) is only visible during the lighting segment of each frame period, as illumination is required in order for the light field to be presented to the user.

In FIG. 9, the frame period of the display layers of the XR device are the same. However, there may be cases where display layers of an XR device have different frame rates. For example, and referring now to FIG. 10, an XR device may have a light field display arrangement that includes a rear display panel that has a slower frame rate than a front display panel of the XR device (or vice versa). In other words, the frame period of a first display layer (e.g., the rear display panel) has a longer duration than the frame period of the second display layer (e.g., the front display panel).

Figure 10:
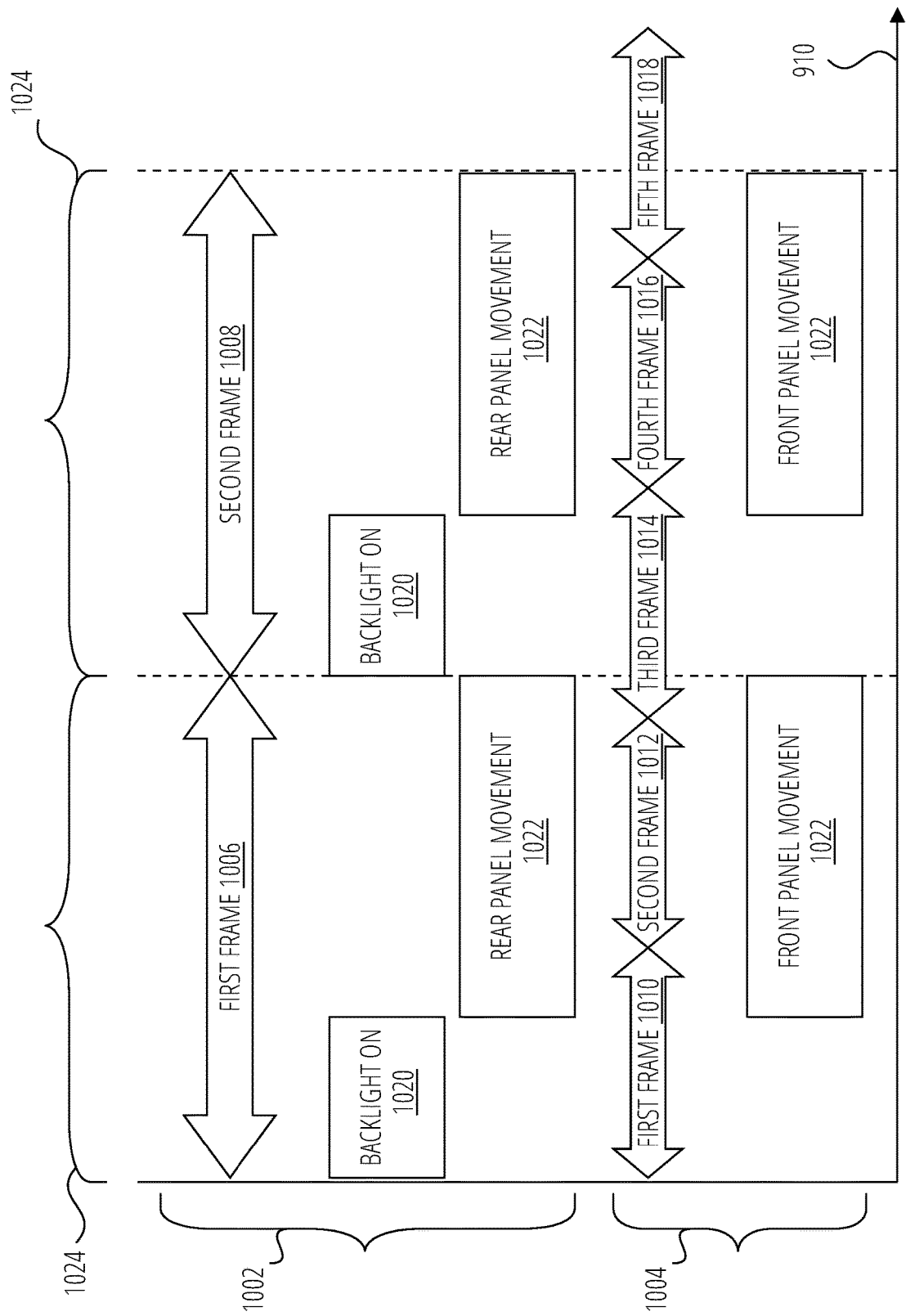
FIG. 10 diagrammatically illustrates adjustment intervals of a light field display arrangement of an XR device, according to some examples, where a front display panel and a rear display panel have different frame rates.

FIG. 10 illustrates a set of rear display panel actions 1002 and a set of front display panel actions 1004 over time (see the time axis 910). In FIG. 10, an adjustment interval 1024 is synchronized with the display layer that has the slowest frame rate. Thus, the duration of the adjustment interval 1024 is set as equal to the duration of the frame period of the rear display panel (see the first frame 1006 and the second frame 1008 as shown in FIG. 10.)

The adjustment interval 1024 includes a lighting segment 1020 during which the backlight of the rear display panel is switched on, and the panels are kept stationary (the front display panel does not have a lighting source). The adjustment interval 1024 further includes a motion segment 1022, during which the backlight is switched off and the panels are moved as required. The adjustment interval 1024 covers a single frame of the rear display panel, but multiple frames of the front display panel (see the first frame 1010, the second frame 1012, the third frame 1014, the fourth frame 1016, and the fifth frame 1018, as shown in FIG. 10).

From an image refreshing perspective, it is noted that the rear display panel may be refreshed after each frame (e.g., directly after the first frame 1006 and directly after the second frame 1008), given that the rear display panel has the slowest refresh rate and it aligns with the low persistence mechanism. On the other hand, refreshing of the front display panel may be delayed. For example, it may only be refreshed at the end of every second frame, e.g., at the end of the second frame 1012 and again at the end of the fourth frame 1016, etc. Given that the backlight is off, for example, for the entire duration of the second frame 1012, it may be efficient to delay refreshing the front display panel until after the second frame 1012. In other words, no visible image will be displayed for the duration of the second frame 1012, resulting in refreshing serving no practical purpose. This configuration may enable power and/or processing resources to be conserved or saved.

Figure 11:
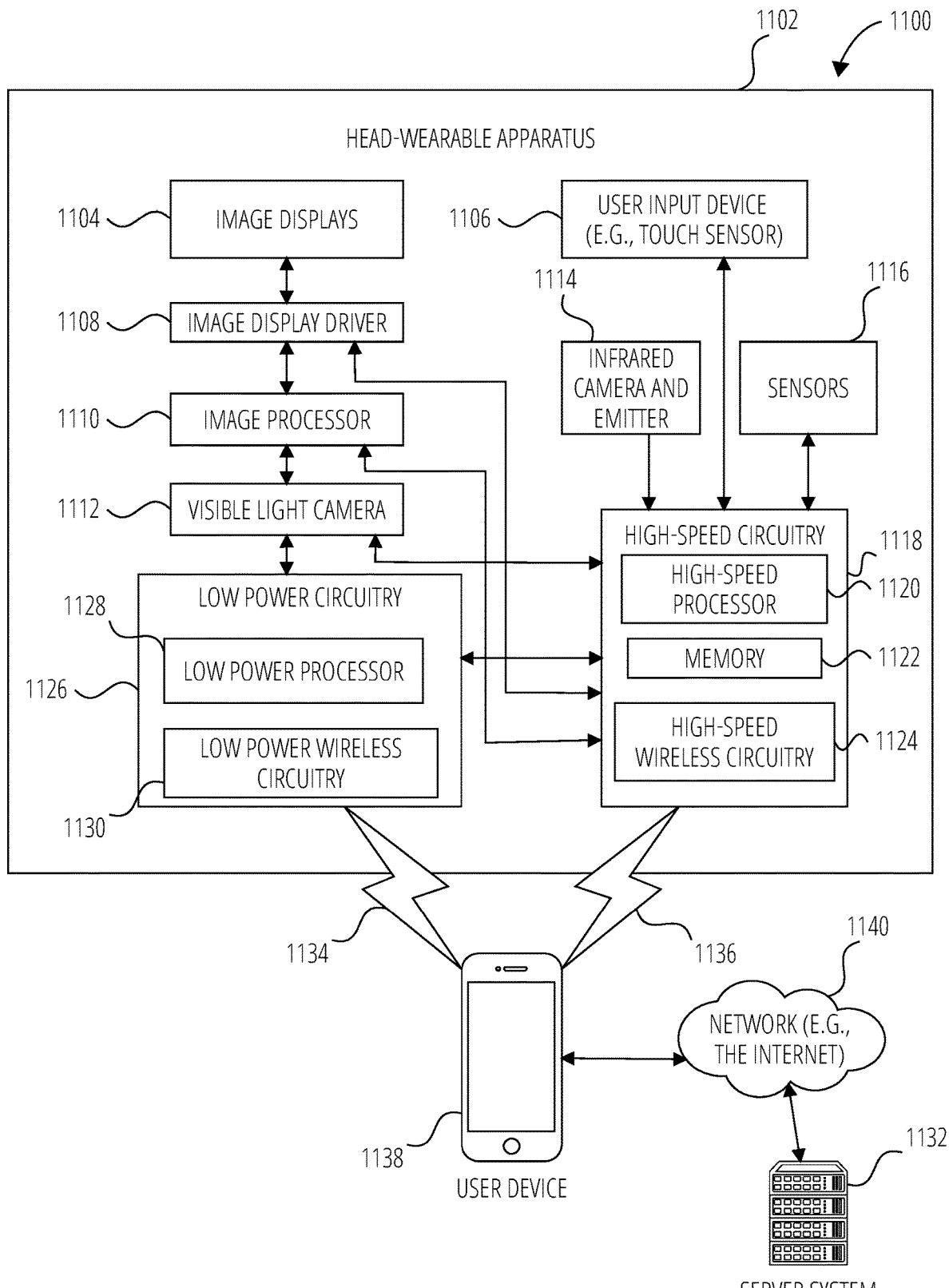
FIG. 11 illustrates a network environment in which a head-wearable apparatus can be implemented according to some examples.

FIG. 11 illustrates a network environment 1100 in which a head-wearable apparatus 1102, e.g., a head-wearable XR device, can be implemented according to some examples. FIG. 11 provides a high-level functional block diagram of an example head-wearable apparatus 1102 communicatively coupled a mobile user device 1138 and a server system 1132 via a suitable network 1140. One or more of the techniques described herein may be performed using the head-wearable apparatus 1102 or a network of devices similar to those shown in FIG. 11.

The head-wearable apparatus 1102 includes a camera, such as at least one of a visible light camera 1112 and an infrared camera and emitter 1114. The head-wearable apparatus 1102 includes other sensors 1116, such as motion sensors or eye tracking sensors. The user device 1138 can be capable of connecting with head-wearable apparatus 1102 using both a communication link 1134 and a communication link 1136. The user device 1138 is connected to the server system 1132 via the network 1140. The network 1140 may include any combination of wired and wireless connections.

The head-wearable apparatus 1102 includes a display arrangement that has several components. The arrangement includes two image displays 1104 of an optical assembly. The two displays include one associated with the left lateral side and one associated with the right lateral side of the head-wearable apparatus 1102. The head-wearable apparatus 1102 also includes an image display driver 1108, an image processor 1110, low-power circuitry 1126, and high-speed circuitry 1118. The image displays 1104 are for presenting images and videos, including an image that can provide a graphical user interface to a user of the head-wearable apparatus 1102. The images and videos may be rendered by creating a light field, including by the adjustment of display layers of the image displays 1104, as described elsewhere herein.

The image display driver 1108 commands and controls the image display of each of the image displays 1104. The image display driver 1108 may deliver image data directly to each image display of the image displays 1104 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 1102 may include a frame and stems (or temples) extending from a lateral side of the frame, or another component to facilitate wearing of the head-wearable apparatus 1102 by a user. The head-wearable apparatus 1102 of FIG. 11 further includes a user input device 1106 (e.g., touch sensor or push button) including an input surface on the head-wearable apparatus 1102. The user input device 1106 is configured to receive, from the user, an input selection to manipulate the graphical user interface of the presented image.

The components shown in FIG. 11 for the head-wearable apparatus 1102 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 1102. Left and right sides of the head-wearable apparatus 1102 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1102 includes a memory 1122 which stores instructions to perform a subset or all of the functions described herein. The memory 1122 can also include a storage device. As further shown in FIG. 11, the high-speed circuitry 1118 includes a high-speed processor 1120, the memory 1122, and high-speed wireless circuitry 1124. In FIG. 11, the image display driver 1108 is coupled to the high-speed circuitry 1118 and operated by the high-speed processor 1120 in order to drive the left and right image displays of the image displays 1104. The high-speed processor 1120 may be any processor capable of managing high-speed communications and operation of any general computing system needed for the head-wearable apparatus 1102. The high-speed processor 1120 includes processing resources needed for managing high-speed data transfers over the communication link 1136 to a wireless local area network (WLAN) using high-speed wireless circuitry 1124. In certain examples, the high-speed processor 1120 executes an operating system such as a LINUX operating system or other such operating system of the head-wearable apparatus 1102 and the operating system is stored in memory 1122 for execution. In addition to any other responsibilities, the high-speed processor 1120 executing a software architecture for the head-wearable apparatus 1102 is used to manage data transfers with high-speed wireless circuitry 1124. In certain examples, high-speed wireless circuitry 1124 is configured to implement Institute of Electrical and Electronic Engineers (IEEE) 1102.11 communication standards, also referred to herein as Wi-Fi™. In other examples, other high-speed communications standards may be implemented by high-speed wireless circuitry 1124.

The low power wireless circuitry 1130 and the high-speed wireless circuitry 1124 of the head-wearable apparatus 1102 can include short range transceivers (Bluetooth™) and wireless wide, local, or wide area network transceivers (e.g., cellular or Wi-Fi™). The user device 1138, including the transceivers communicating via the communication link 1134 and communication link 1136, may be implemented using details of the architecture of the head-wearable apparatus 1102, as can other elements of the network 1140.

The memory 1122 includes any storage device capable of storing various data and applications, including, among other things, camera data generated by the visible light camera 1112, sensors 1116, and the image processor 1110, as well as images generated for display by the image display driver 1108 on the image displays of the image displays 1104. While the memory 1122 is shown as integrated with the high-speed circuitry 1118, in other examples, the memory 1122 may be an independent standalone element of the head-wearable apparatus 1102. In certain such examples, electrical routing lines may provide a connection through a chip that includes the high-speed processor 1120 from the image processor 1110 or low power processor 1128 to the memory 1122. In other examples, the high-speed processor 1120 may manage addressing of memory 1122 such that the low power processor 1128 will boot the high-speed processor 1120 any time that a read or write operation involving memory 1122 is needed.

As shown in FIG. 11, the low power processor 1128 or high-speed processor 1120 of the head-wearable apparatus 1102 can be coupled to the camera (visible light camera 1112, or infrared camera and emitter 1114), the image display driver 1108, the user input device 1106 (e.g., touch sensor or push button), and the memory 1122. The head-wearable apparatus 1102 also includes sensors 1116, which may be the motion components 1334, position components 1338, environmental components 1336, and biometric components 1332, e.g., as described below with reference to FIG. 13. In particular, motion components 1334 and position components 1338 are used by the head-wearable apparatus 1102 to determine and keep track of the position and orientation (the "pose") of the head-wearable apparatus 1102 relative to a frame of reference or another object, in conjunction with a video feed from one of the visible light cameras 1112, using for example techniques such as structure from motion (SfM) or VIO.

In some examples, and as shown in FIG. 11, the head-wearable apparatus 1102 is connected with a host computer. For example, the head-wearable apparatus 1102 is paired with the user device 1138 via the communication link 1136 or connected to the server system 1132 via the network 1140. The server system 1132 may be one or more computing devices as part of a service or network computing system, for example, that include a processor, a memory, and network communication interface to communicate over the network 1140 with the user device 1138 and head-wearable apparatus 1102.

The user device 1138 includes a processor and a network communication interface coupled to the processor. The network communication interface allows for communication over the network 1140, communication link 1134 or communication link 1136. The user device 1138 can further store at least portions of the instructions for implementing functionality described herein.

Output components of the head-wearable apparatus 1102 include visual components, such as a display (e.g., one or more liquid-crystal display (LCD)), one or more plasma display panel (PDP), one or more light emitting diode (LED) display, one or more projector, or one or more waveguide. The image displays 1104 of the optical assembly are driven by the image display driver 1108. The output components of the head-wearable apparatus 1102 further include acoustic components (e.g., speakers), haptic components (e.g., a vibratory motor), other signal generators, and so forth. The input components of the head-wearable apparatus 1102, the user device 1138, and server system 1132, such as the user input device 1106, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1102 may optionally include additional peripheral device elements. Such peripheral device elements may include biometric sensors, additional sensors, or display elements integrated with the head-wearable apparatus 1102. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1136 from the user device 1138 via the low power wireless circuitry 1130 or high-speed wireless circuitry 1124.

Figure 12:
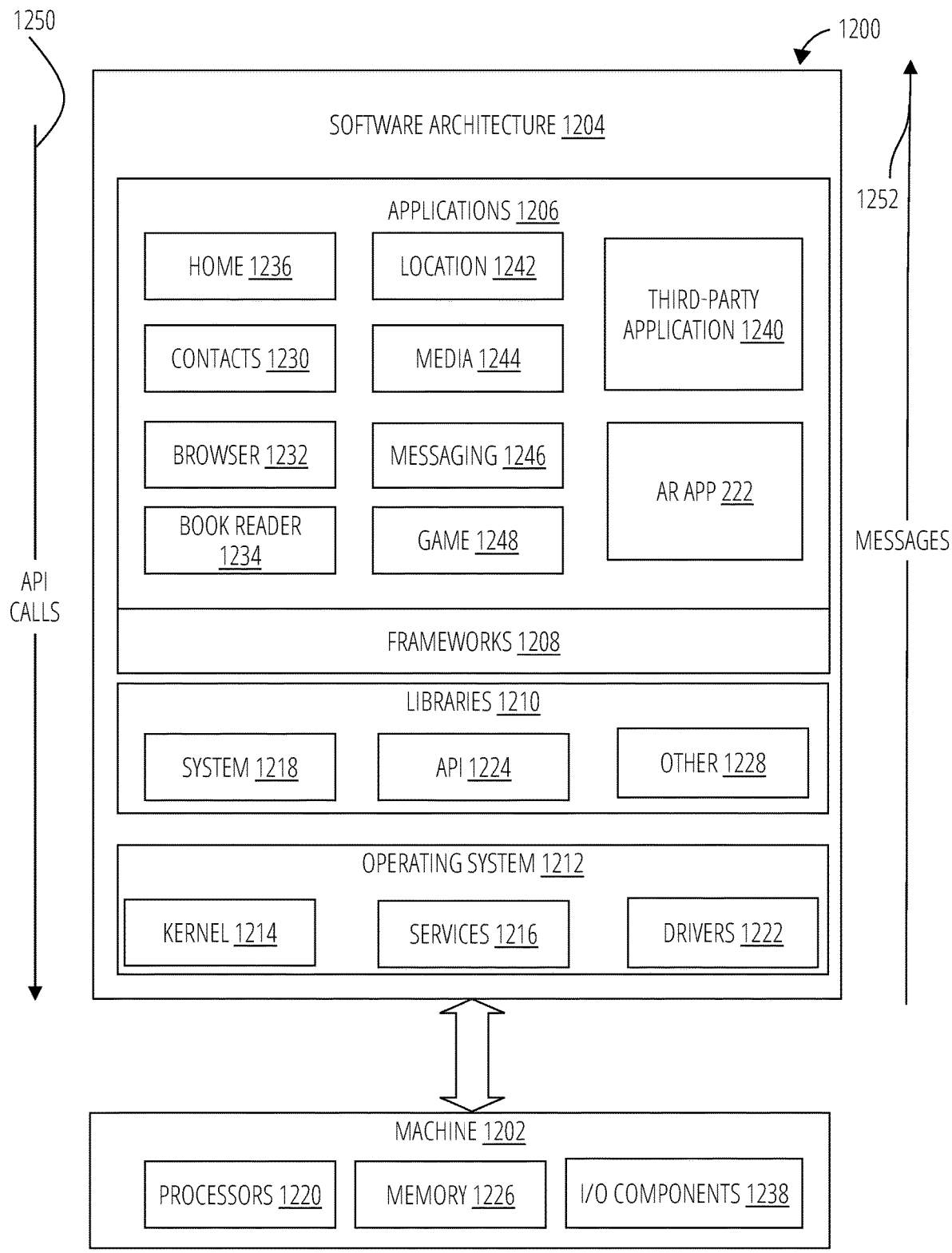
FIG. 12 is block diagram showing a software architecture within which the present disclosure may be implemented, according to some examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke Application Programming Interface calls, API calls 1250, through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In some examples, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In some examples, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 12, the third-party application 1240 can invoke the API calls 1250 provided by the operating system 1212 to facilitate functionality described herein. The applications 1206 may include an AR application such as the AR application 222 described herein, according to some examples.

Figure 13:
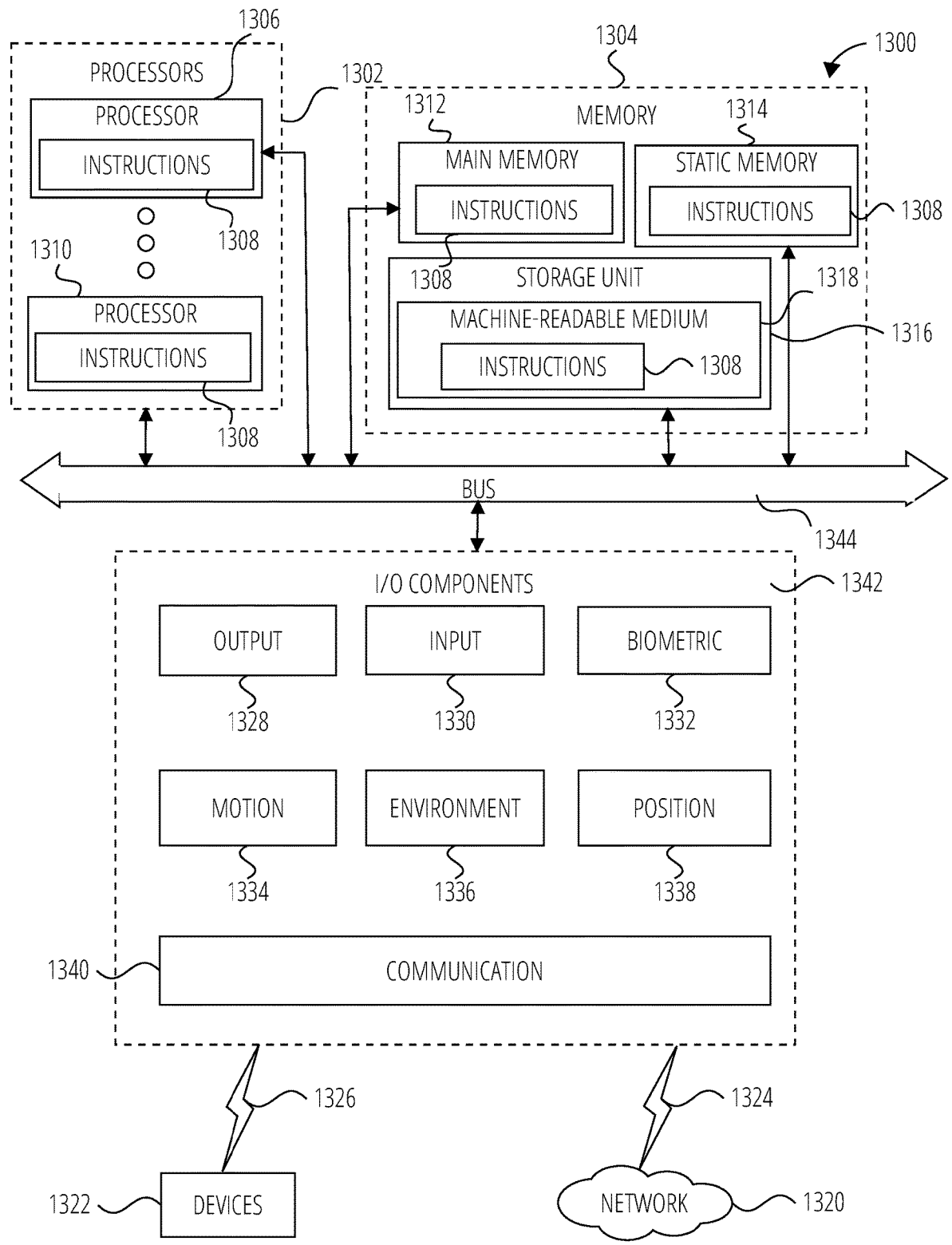
FIG. 13 is a diagrammatic representation of a machine in the form of a computer system within which a set of instructions may be executed for causing the machine to perform any one or more of the methodologies discussed herein, according to some examples.

FIG. 13 is a diagrammatic representation of a machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, VR device, a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In some examples, the processors 1302 (e.g., a Central Processing Unit (CPU), a Reduced Instruction Set Computing (RISC) processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, accessible to the processors via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors, or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various examples, the I/O components 1342 may include output components 1328 and input components 1330. The output components 1328 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth™ components, Wi-Fi™ components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi™ signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although examples have been described in which image planes or light fields are adjusted by mechanical means, e.g., by mechanically displacing one or more display panels using a mechanical adjustment mechanism with actuators, it will be appreciated that the adjustment mechanism need not be mechanical or displaceable in all examples, and non-mechanical or non-displaceable means may be employed in other examples, e.g., deformable mirrors or other deformable optical elements, tunable lenses (for example, locating a tunable lens in front of each front LCD panel and a tunable lens between each front and rear LCD, thus providing four tunable lenses), or other varifocal or varifocal-like mechanisms.

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a head-wearable extended reality (XR) device comprising: a frame; and a light field display arrangement mounted to the frame, the light field display arrangement comprising a first display layer and a second display layer, at least one of the first display layer or the second display layer being selectively displaceable relative to the frame.

In Example 2, the subject matter of Example 1 includes, wherein the first display layer and the second display layer are independently displaceable relative to the frame.

In Example 3, the subject matter of Examples 1-2 includes, wherein the light field display arrangement comprises a backlight that is arranged to illuminate the first display layer and the second display layer, the XR device further comprising one or more processors to control the light field display arrangement such that the backlight is deactivated during displacement of the first display layer or the second display layer relative to the frame.

In Example 4, the subject matter of Example 3 includes, wherein a frame period of at least one of the first display layer or the second display layer defines an adjustment interval, the adjustment interval comprising a lighting segment and a motion segment, wherein, during the lighting segment, the one or more processors activate the backlight and keep the first display layer and the second display layer stationary relative to the frame, and during the motion segment, the one or more processors deactivate the backlight and cause displacement of at least one of the first display layer or the second display layer relative to the frame.

In Example 5, the subject matter of Example 4 includes, wherein the frame period of the first display layer has a longer duration than the frame period of the second display layer, and wherein the adjustment interval is synchronized with the frame period of the first display layer.

In Example 6, the subject matter of Examples 1-5 includes, wherein the first display layer and the second display layer are displaceable relative to each other to adjust a light field zone that is defined by the first display layer and the second display layer.

In Example 7, the subject matter of Example 6 includes, an eye tracking sensor to track one or more eyes of a user of the XR device; and one or more processors communicatively coupled to the eye tracking sensor and to the light field display arrangement to: determine, based on the tracking of the one or more eyes of the user, a value of an eye tracking uncertainty indicator, and cause displacement of the first display layer relative to the second display layer to adjust the light field zone based on the value of the eye tracking uncertainty indicator.

In Example 8, the subject matter of Examples 6-7 includes, an eye tracking sensor to track one or more eyes of a user of the XR device; and one or more processors communicatively coupled to the eye tracking sensor and to the light field display arrangement to: generate an estimated gaze depth, and cause displacement of the first display layer relative to the second display layer to adjust the light field zone based on the estimated gaze depth.

In Example 9, the subject matter of Example 8 includes, wherein the generation of the estimated gaze depth comprises: generating, based on the tracking of the one or more eyes of the user, a gaze location estimation; generating scene depth data associated with a scene being viewed by the user; and processing the gaze location estimation and the scene depth data to obtain a set of gaze depth predictions that include a minimum depth prediction and a maximum depth prediction, wherein the light field zone is adjusted to accommodate the minimum depth prediction and the maximum depth prediction.

In Example 10, the subject matter of Example 9 includes, wherein the gaze location estimation comprises an estimated gaze point and a value of an eye tracking uncertainty indicator.

In Example 11, the subject matter of Examples 9-10 includes, wherein the processing of the gaze location estimation and the scene depth data comprises: generating, based on the gaze location estimation and the scene depth data, a set of preliminary gaze depth values; accessing vergence data from the eye tracking sensor; and filtering the set of preliminary gaze depth values using the vergence data to obtain the set of gaze depth predictions.

In Example 12, the subject matter of Examples 1-11 includes, wherein the XR device comprises an adjustment mechanism to displace at least one of the first display layer or the second display layer relative to the frame.

In Example 13, the subject matter of Example 12 includes, wherein the adjustment mechanism comprises at least one linear actuator that is mounted to the frame.

In Example 14, the subject matter of Examples 1-13 includes, wherein the first display layer comprises a first spatial light modulator (SLM) layer and the second display layer comprises a second SLM layer, the light field display arrangement further comprising a backlight that is arranged to illuminate the first display layer and the second display layer to generate a directional field of light.

In Example 15, the subject matter of Example 14 includes, wherein the first display layer and the second display layer are arranged to modulate the backlight in a multiplicative manner.

In Example 16, the subject matter of Example 15 includes, wherein each of the first display layer and the second display layer comprises a liquid-crystal display (LCD) panel.

In Example 17, the subject matter of Examples 1-16 includes, wherein the light field display arrangement is an optical see-through (OST) display arrangement.

In Example 18, the subject matter of Example 17 includes, wherein the first display layer and the second display layer are offset from a gaze path of the XR device, the light field display arrangement further comprising a beam splitter to direct light from the first display layer and the second display layer into the gaze path.

Example 19 is a method performed by a head-wearable extended reality (XR) device, the XR device comprising one or more processors, a frame, and a light field display arrangement mounted to the frame, the method comprising: activating, by the one or more processors, a user session; and selectively causing, by the one or more processors and while the user session is active, displacement of at least one of a first display layer or a second display layer of the light field display arrangement relative to the frame.

Example 20 is a non-transitory computer-readable storage medium, the computer-readable storage medium including instructions that when executed by at least one processor of a head-wearable extended reality (XR) device that comprises a frame and a light field display arrangement, cause the at least one processor to perform operations comprising: activating, by the at least one processor, a user session; and selectively causing, by the at least one processor and while the user session is active, displacement of at least one of a first display layer or a second display layer of the light field display arrangement relative to the frame.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A head-wearable extended reality (XR) device comprising:
a light field display arrangement mounted to a frame, the light field display arrangement comprising a first display layer, a second display layer, and at least one light source that is arranged to illuminate the first display layer and the second display layer to generate a directional field of light, at least one of the first display layer or the second display layer being selectively displaceable relative to the frame, wherein one of the first display layer or the second display layer is a front display layer and the other one of the first display layer or the second display layer is a rear display layer, the front display layer being arranged in front of the rear display layer in a light path of the XR device, and wherein the first display layer comprises a first spatial light modulator (SLM) layer and the second display layer comprises a second SLM layer.

2. The XR device of claim 1, wherein the first display layer and the second display layer are displaceable relative to each other to adjust a light field zone that is defined by the first display layer and the second display layer.

3. The XR device of claim 2, further comprising:
an eye tracking sensor to track one or more eyes of a user of the XR device; and
one or more processors communicatively coupled to the eye tracking sensor and to the light field display arrangement to:
generate an estimated gaze depth, and
cause displacement of the first display layer relative to the second display layer to adjust the light field zone based on the estimated gaze depth.

4. The XR device of claim 3, wherein the generation of the estimated gaze depth comprises:
generating, based on the tracking of the one or more eyes of the user, a gaze location estimation;
generating scene depth data associated with a scene being viewed by the user; and
processing the gaze location estimation and the scene depth data to obtain a set of gaze depth predictions that include a minimum depth prediction and a maximum depth prediction, wherein the light field zone is adjusted to accommodate the minimum depth prediction and the maximum depth prediction.

5. The XR device of claim 4, wherein the gaze location estimation comprises an estimated gaze point and a value of an eye tracking uncertainty indicator.

6. The XR device of claim 4, wherein the processing of the gaze location estimation and the scene depth data comprises:
generating, based on the gaze location estimation and the scene depth data, a set of preliminary gaze depth values;
accessing vergence data from the eye tracking sensor; and
filtering the set of preliminary gaze depth values using the vergence data to obtain the set of gaze depth predictions.

7. The XR device of claim 2, further comprising:
an eye tracking sensor to track one or more eyes of a user of the XR device; and
one or more processors communicatively coupled to the eye tracking sensor and to the light field display arrangement to:
determine, based on the tracking of the one or more eyes of the user, a value of an eye tracking uncertainty indicator, and
cause displacement of the first display layer relative to the second display layer to adjust the light field zone based on the value of the eye tracking uncertainty indicator.

8. The XR device of claim 1, further comprising one or more processors to control the light field display arrangement such that the at least one light source is deactivated during displacement of the first display layer or the second display layer relative to the frame.

9. The XR device of claim 8, wherein a frame period of at least one of the first display layer or the second display layer defines an adjustment interval, the adjustment interval comprising a lighting segment and a motion segment, wherein, during the lighting segment, the one or more processors activate the at least one light source and keep the first display layer and the second display layer stationary relative to the frame, and during the motion segment, the one or more processors deactivate the at least one light source and cause displacement of at least one of the first display layer or the second display layer relative to the frame.

10. The XR device of claim 9, wherein the frame period of the first display layer has a longer duration than the frame period of the second display layer, and wherein the adjustment interval is synchronized with the frame period of the first display layer.

11. The XR device of claim 1, wherein the XR device comprises an adjustment mechanism to displace at least one of the first display layer or the second display layer relative to the frame.

12. The XR device of claim 11, wherein the adjustment mechanism comprises at least one linear actuator that is mounted to the frame.

13. The XR device of claim 1, wherein the light field display arrangement is an optical see-through (OST) display arrangement.

14. The XR device of claim 13, wherein the first display layer and the second display layer are offset from a gaze path of the XR device, the light field display arrangement further comprising a beam splitter to direct light from the first display layer and the second display layer into the gaze path.

15. The XR device of claim 1, wherein the first display layer and the second display layer are independently displaceable relative to the frame.

16. The XR device of claim 1, wherein the first display layer and the second display layer are arranged to modulate the at least one light source in a multiplicative manner.

17. The XR device of claim 1, wherein each of the first display layer and the second display layer comprises a liquid-crystal display (LCD) panel.

18. A method performed by a head-wearable extended reality (XR) device, the XR device comprising one or more processors and a light field display arrangement mounted to a frame, the method comprising:
activating, by the one or more processors, a user session; and
selectively causing, by the one or more processors and while the user session is active, displacement of at least one of a first display layer or a second display layer of the light field display arrangement relative to the frame, wherein one of the first display layer or the second display layer is a front display layer and the other one of the first display layer or the second display layer is a rear display layer, the front display layer being arranged in front of the rear display layer in a light path of the XR device, the light field display arrangement further comprising at least one light source that is arranged to illuminate the first display layer and the second display layer to generate a directional field of light, wherein the first display layer comprises a first SLM layer and the second display layer comprises a second SLM layer.

19. The method of claim 18, further comprising controlling, by the one or more processors, the light field display arrangement such that the at least one light source is deactivated during displacement of the first display layer or the second display layer relative to the frame.

20. A non-transitory computer-readable storage medium, the computer-readable storage medium including instructions that when executed by at least one processor of a head-wearable extended reality (XR) device that comprises a light field display arrangement mounted to a frame, cause the at least one processor to perform operations comprising:
activating, by the at least one processor, a user session; and
selectively causing, by the at least one processor and while the user session is active, displacement of at least one of a first display layer or a second display layer of the light field display arrangement relative to the frame, wherein one of the first display layer or the second display layer is a front display layer and the other one of the first display layer or the second display layer is a rear display layer, the front display layer being arranged in front of the rear display layer in a light path of the XR device, the light field display arrangement further comprising at least one light source that is arranged to illuminate the first display layer and the second display layer to generate a directional field of light, wherein the first display layer comprises a first SLM layer and the second display layer comprises a second SLM layer.

* * * * *